United States Patent
Jordan et al.

(10) Patent No.: US 10,444,384 B2
(45) Date of Patent: Oct. 15, 2019

(54) BORON NITRIDE NANOTUBE NEUTRON DETECTOR

(71) Applicant: BNNT, LLC, Newport News, VA (US)

(72) Inventors: Kevin C. Jordan, Newport News, VA (US); R. Roy Whitney, Newport News, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

(21) Appl. No.: 15/573,730

(22) PCT Filed: May 13, 2016

(86) PCT No.: PCT/US2016/032385
§ 371 (c)(1),
(2) Date: Nov. 13, 2017

(87) PCT Pub. No.: WO2016/183455
PCT Pub. Date: Nov. 17, 2016

(65) Prior Publication Data
US 2018/0348384 A1    Dec. 6, 2018

Related U.S. Application Data

(60) Provisional application No. 62/160,853, filed on May 13, 2015, provisional application No. 62/162,983, (Continued)

(51) Int. Cl.
*G01T 3/06* (2006.01)
*G01T 3/00* (2006.01)

(52) U.S. Cl.
CPC .............. *G01T 3/06* (2013.01); *G01T 3/00* (2013.01); *G01T 3/008* (2013.01)

(58) Field of Classification Search
CPC .... G01T 3/06; G01T 3/00; G01T 3/08; G01T 5/00; G01T 5/08; G01T 3/008
(Continued)

(56) References Cited

U.S. PATENT DOCUMENTS

| 3,216,942 A | 11/1965 | Wentorf |
| 3,352,637 A | 11/1967 | Heymer |

(Continued)

FOREIGN PATENT DOCUMENTS

| CA | 2689629 A1 | 2/2009 |
| KR | 2011-0113201 | 10/2011 |

(Continued)

OTHER PUBLICATIONS

International Search Report and Written Opinion for PCT/US2016/032385 dated Aug. 26, 2016.
(Continued)

*Primary Examiner* — David P Porta
*Assistant Examiner* — Meenakshi S Sahu
(74) *Attorney, Agent, or Firm* — Joshua B. Brady; Nixon & Vanderhye, P.C.

(57) ABSTRACT

Boron nitride nanotubes (BNNTs) with 10B combined with a scintillation gas can serve as the basis for detecting thermal neutrons by detecting light from the decay products of the thermal neutron's absorption on the 10B atoms in the BNNT Material as the resultant decay products pass through the scintillating gas. BNNTs with 11B can be utilized as a scaffold for 238U and combined with a scintillation gas as the basis for detecting fast neutrons via detecting light from the fission decay products passing through the scintillating gas. Both technologies provide high spatial and temporal resolution for the detection of thermal neutrons and fast neutrons respectively.

26 Claims, 20 Drawing Sheets

Related U.S. Application Data filed on May 18, 2015, provisional application No. 62/173,141, filed on Jun. 9, 2015, provisional application No. 62/254,569, filed on Nov. 12, 2015.

(58) Field of Classification Search
USPC .......... 250/390.11, 264, 269.1, 269.4, 269.5
See application file for complete search history.

(56) References Cited

U.S. PATENT DOCUMENTS

| | | | |
|---|---|---|---|
| 4,913,887 A | 4/1990 | Sato | |
| 5,305,612 A | 4/1994 | Higham | |
| 5,593,740 A | 1/1997 | Strumban | |
| 5,932,294 A | 8/1999 | Colombo | |
| 6,967,011 B1 | 11/2005 | Saboungi | |
| 7,335,890 B2* | 2/2008 | Utterback | G01T 3/06 250/370.02 |
| 7,582,880 B2* | 9/2009 | Wallace | G01T 3/06 250/390.11 |
| 7,704,480 B2 | 4/2010 | Jiang | |
| 7,927,525 B2 | 4/2011 | Lizotte | |
| 7,993,620 B2 | 8/2011 | Lashmore | |
| 8,206,674 B2 | 6/2012 | Smith | |
| 8,309,242 B2 | 11/2012 | Wei | |
| 8,602,765 B2 | 12/2013 | Jiang | |
| 8,673,120 B2 | 3/2014 | Whitney | |
| 8,703,023 B2 | 4/2014 | Sainsbury | |
| 8,753,578 B1 | 6/2014 | Smith | |
| 2002/0113335 A1 | 8/2002 | Lobovsky | |
| 2004/0061047 A1 | 4/2004 | Bolozdynya | |
| 2005/0116336 A1 | 6/2005 | Chopra | |
| 2005/0118090 A1 | 6/2005 | Shaffer | |
| 2005/0126766 A1 | 6/2005 | Lee | |
| 2005/0155358 A1 | 7/2005 | Ash | |
| 2005/0237442 A1 | 10/2005 | Yamazaki | |
| 2006/0098389 A1 | 5/2006 | Liu | |
| 2006/0173397 A1 | 8/2006 | Tu | |
| 2007/0004225 A1 | 1/2007 | Lu | |
| 2008/0138577 A1 | 6/2008 | Sheehan | |
| 2008/0150165 A1 | 6/2008 | Stumbo | |
| 2008/0153959 A1 | 6/2008 | Charati | |
| 2008/0187657 A1 | 8/2008 | Altan | |
| 2008/0191395 A1 | 8/2008 | Johnson | |
| 2008/0296559 A1 | 12/2008 | Kreupl | |
| 2009/0117021 A1 | 5/2009 | Smith | |
| 2010/0051879 A1 | 3/2010 | Sainsbury | |
| 2010/0108276 A1 | 5/2010 | Kuwahara | |
| 2010/0192535 A1 | 8/2010 | Smith | |
| 2011/0104534 A1 | 5/2011 | Wei | |
| 2011/0140318 A1 | 6/2011 | Reeves | |
| 2011/0143915 A1 | 6/2011 | Yin | |
| 2011/0192016 A1 | 8/2011 | Kang | |
| 2011/0212308 A1 | 9/2011 | Brown | |
| 2012/0045688 A1 | 2/2012 | Liu | |
| 2012/0085970 A1 | 4/2012 | Zhang | |
| 2012/0168299 A1 | 7/2012 | Whitney | |
| 2012/0199747 A1* | 8/2012 | Letant | B82Y 15/00 250/362 |
| 2012/0321785 A1 | 12/2012 | Rogers | |
| 2013/0029242 A1 | 1/2013 | Mizuhata | |
| 2013/0064750 A1 | 3/2013 | Zettl | |
| 2013/0099264 A1 | 4/2013 | Zimmerman | |
| 2013/0144576 A1 | 6/2013 | Gnoffo | |
| 2013/0255906 A1 | 10/2013 | Chang et al. | |
| 2014/0042330 A1 | 2/2014 | Gozani | |
| 2014/0217693 A1 | 8/2014 | Schmidt | |
| 2014/0364529 A1* | 12/2014 | Park | C08J 9/36 521/183 |
| 2015/0033937 A1 | 2/2015 | Lashmore | |
| 2015/0125374 A1 | 5/2015 | Smith | |
| 2016/0083253 A1 | 3/2016 | Kim | |
| 2016/0144401 A1 | 5/2016 | Carter | |

FOREIGN PATENT DOCUMENTS

| | | |
|---|---|---|
| WO | 2008/113892 | 9/2008 |
| WO | 2009/017526 | 2/2009 |
| WO | 2012/096775 | 7/2012 |
| WO | 2013/021797 | 7/2012 |
| WO | 2012/108941 | 8/2012 |
| WO | 2013/082117 | 6/2013 |
| WO | 2014/169382 | 10/2014 |
| WO | 2014/197675 | 12/2014 |
| WO | 2015/164777 | 10/2015 |
| WO | 2016/100715 | 6/2016 |

OTHER PUBLICATIONS

International Preliminary Report on Patentability for PCT/US2016/032385 dated Jun. 9, 2017.

Hanafin, et al., Boron Fiber Neutron Shielding Properties, Specialty Materials, 2011 (Retrieved on Jul. 14, 2016) from Internet URL <http://www.specmaterials.com/pdfs/boronneutronshielding.pdf> p. 1.

Yu, et al., Dispersion of boron nitride nanotubes in aqueous solution with the help of ionic surfactants. Solid State Communications 149 (2009) 763-766. (Retrieved Jul. 14, 2016 from internet URL <http://dro.deakin.edu.au/view/DU:30029180> pp. 763-766.

Apr. 11, 2016 International Search Report issued in International Application No. PCT/US2015/066464.

Apr. 11 2016 Written Opinion issued in International Application No. PCT/US2015/066464.

Apr. 14, 2017 International Search Report issued in International Application No. PCT/US2017/016250.

Aug. 7, 2015 International Search Report issued in International Application No. PCT/US2015/27570.

Aug. 7 2015 Written Opinion issued in International Application No. PCT/US2015/27570.

Cohen et al., "The physics of boron nitride nanotubes," Physics Today, vol. 63, No. 11, Nov. 1, 2010, pp. 34-38.

Dec. 10, 2018 Extended European Search Report issued in European Application No. 16796866.8.

Dec. 11, 2017 Office Action issued in U.S. Appl. No. 15/305,994 (dated Dec. 12, 2017 Supplemental Action).

Dec. 21, 2017 Office Action issued in U.S. Appl. No. 15/540,539.

Demirel M.C. et al., "Spatially Organized Free-Standing Poly(p-xylylene) Nanowires Fabricated by Vapor Deposition", Langmuir, 2007, vol. 23, issue 11, pp. 5861-5863; retrieved from the Internet: DOI: 10.1021/la700538f>.

Fathalizadeh et al., Nano Lett., 2014, 14, 4881.

Feb. 2, 2017 European Extended Search Report issued in European Application No. 15 78 3501.

Feb. 9, 2017 Notice of Preliminary Rejection issued in Korean Application No. 10-2016-7031895.

Feb. 17, 2015 International Search Report issued in International Application No. PCT/US2014/63349.

Feb. 17, 2015 Written Opinion issued in International Application No. PCT/US2014/63349.

Gnoffo, et al., "Modeling of Laser Vaporization and Plume Chemistry in a Boron Nitride Nanotube Production Rig" NASA Technical Reports Server (NTRS) 20120011733, 23 pages, Jun. 25, 2012 (Jun. 25, 2012), accessed online at https://archive.org/details/NASA NTRS Archive 20120011733.

Goldberg D. et al., "Boron Nitride Nanotubes and Nanosheets", ACS Nano, 2010, vol. 4, issue 6, pp. 2979-2993; retrieved from the Internet: <DOI: 10.1021/nn1006495>.

Hong et al., Strong viscous behavior discovered in nanotube mats, as observed in boron nitride nanotube mats, Composites Part B, vol. 91, Feb. 8, 2016, retrieved Mar. 13, 2018, Retrieved from the Internet: <URL: https://pdfs.semanticscholar.org/ba63/afeeecba9dc121b4c71625f5a0942244d862.pdf , pp. 56-64.

Hutchings C. W. et al., "Apparatus tor chemical vapor deposition of polymide films", Review of Scientific Instruments, 1995, vol. 66, issue 7, pp. 3943-3947; retrieved from the Internet: <DOI: 10.1063/1.1145399>.

(56) References Cited

OTHER PUBLICATIONS

Islam et al., Characterization of Carbon Fiber Reinforced Epoxy Composites Modified with Nanoclay and Carbon Nanotubes, Procedia Engineering, vol. 105, 2015, retrieved Mar. 14, 2018, retrieved from the Internet: <URL:https://ac.els-cdn.com/S1877705815008759/1-s2.0-S1877705815008759-main.pdf?_tid:9b94el3b-400c-46a3-b3af-1bdfbc3000af&acdnat=1521215859_72ca270e12acadfde8d5b0c07cf0ac1c. , pp. 821-828.
Jan. 5, 2018 Office Action issued in Canadian Application No. 2945977.
Jan. 12, 2018 Communication issued in European Application No. 16796866.8.
Jan. 19, 2016 International Search Report issued in International Application No. PCT/US2015/058615.
Jan. 19, 2016 Written Opinion issued in International Application No. PCT/US2015/058615.
Jan. 29, 2018 International Preliminary Examination Report issued in International Application No. PCT/US2017/016250.
Jul. 26, 2018 Supplemental Search Report issued in European Application No. 15 87 1103.
Jun. 7, 2017 Communication pursuant to Article 94(3) Epc issued in European Application No. 15 783 501.8.
Jun. 9, 2017 Office Action issued in Canadian Application No. 2945977.
Kim et al., ACS Nano, 2014, 8, 6211.
Kingston, "Large-scale synthesis of few-walled small diameter boron nitride nanotubes (sub-10 nm) by an induction thermal plasma," NT13 Espoo, Finland, Jun. 28, 2013.
Mar. 13, 2018 Notification of Reasons for Refusal issued in Japanese Application No. 2017-507928.
Mar. 28, 2018 International Search Report issued in International Application No. PCT/US2018/017231.
Mar. 28, 2018 Written Opinion issued in International Application No. PCT/US2018/017231.
May 24, 2018 Supplementary European Search Report issued in European Application No. 15854542.6.
May 26, 2016 International Search Report issued in International Application No. PCT/US2016/023432.
May 26, 2016 Written Opinion issued in International Application No. PCT/US2016/023432.
Mukhanov, et al., On Electrical Conductivity of Melts of Boron and Its Compounds Under Pressure, Journal of Superhard Materials, vol. 37, No. 4, 2015, pp. 289-291.
Nishiwaki et al., Atomic structures and formation mechanism of boron nitride nanotubes and nanohorns synthesized by arc-melting LaB6 powders, J. of the European Ceramic Society 26, 2006, pp. 435-441.
Nov. 7, 2017 Communication pursuant to Article 94(3) EPC issued in European Application No. 15 783 501.8.
Nov. 17, 2016 Office Action issued in Canadian Application No. 2945977.
Nov. 19, 2018 Office Action issued in Canadian Application No. 2945977.
Nov. 21, 2017 Notification of Reasons for Refusal issued in Japanese Application No. 2017507928.
Nov. 29, 2018 Extended European Search Report issued in European Application No. 16793614.5.
Oct. 13, 2017 International Search Report issued in International Application No. PCT/US2017/043140.
Oct. 13, 2017 Written Opinion issued in International Application No. PCT/US2017/043140.
Oct. 20, 2017 Office Action issued in U.S. Appl. No. 15/689,500.
Oct. 22, 2018 Supplementary European Search Report issued in European Application No. 15871103.6.
Oct. 25, 2016 Examiner's First Patent Examination Report issued in Australian Patent Application No. 2015249316.
Peters et al., "A New Fullerene synthesis," Angew. Chem. Int. Ed., vol. 31, No. 2, , 1992, VCH Verlagsgesellschaft mbH, W-6940 Weinheim, pp. 223-224.
Putkonen M. et al., "Atomic layer deposition of polyimide thin films", Journal of Materials Chemistry, 2006, vol. 17, issue 7, pp. 664-669; retrieved from the Internet: <DOI: 10.1039/B612823H>.
Smith, et al., Very Long Single and Few-walled Boron Nitride Nanotubes via the Pressurized Vapor/Condenser Method, Nanotechnology, 2009.
Su et al., Selective Growth of Boron Nitride Nanotubes by Plasma-Assisted and Iron-Catalytic CVD Methods, J. Phys. Chem., 113, Jul. 22, 2009, pp. 14681-14688.
Tiano et al., "Boron Nitride Nanotube: Synthesis and Applications," Proc. of SPIE, vol. 9060, 2014.
Wang, et al., Recent Advancements in Boron Nitride Nanotubes, Nanoscale, 2010, 2, pp. 2028-2034.
Yanagishita H. et al., "Preparation of polyimide composite membrane by chemical-vapor-deposition and polymerization technique (CVDP)", Journal of Applied Polymer Science, 1993, vol. 49, issue 4, pp. 565-572; retrieved from the Internet: <DOI: 10.1002/app.1993.070490402>.

\* cited by examiner

BORON NITRIDE NANOTUBE NEUTRON DETECTOR

CROSS REFERENCE TO RELATED APPLICATIONS

This application claims benefit to U.S. Provisional Patent Application No. 62/160,853, filed May 13, 2015; U.S. Provisional Patent Application No. 62/162,983 filed May 18, 2015; U.S. Provisional Patent Application No. 62/173,141 filed Jun. 9, 2015; and U.S. Provisional Patent Application No. 62/254,569 filed Nov. 12, 2015. The contents of these applications are expressly incorporated by reference.

STATEMENT REGARDING GOVERNMENT SUPPORT

None.

FIELD OF THE INVENTION

The present invention relates to detecting thermal neutrons and fast neutrons by inclusion of boron nitride nanotubes (BNNTs).

BACKGROUND

Introduction

Thermal neutron detectors usually employ materials with 10B (boron with 10 nucleons, i.e. 5 protons and 5 neutrons) or 3He (2 protons and 1 neutron). 157Gd, 6Li and a few other isotopes are also sometimes used but methods for incorporating them in large volume detectors have not been developed with the exception of some 6Li-based efforts.

Natural boron is approximately 20% 10B and 80% 11B. The 10B-based detectors are more common because almost all 3He comes from reprocessing nuclear waste, 3He is in high demand, and 3He is consequently very expensive. Most 10B-based detectors utilize BF3 and are typically a few cm in diameter with the BF3 at typically from one half to three atmosphere pressure. BF3 is toxic and must be carefully contained. For 10B, 3He and 6Li-based detectors, most employ systems to detect the electronic pulses or light coming from the ionization produced by the resultant decay products as the ions slow down in surrounding media. A variety of ionization chambers, multi wire proportional chambers (MWPC), gas electron multiplier (GEM), straw tube, solar blind photomultipliers, solid state photomultipliers, linear strip sensors, etc. are used. Typical sizes for BF3-based thermal neutron detectors are several cm in diameter and length and with associated high voltages in the range of 1,500-2,000 volts. Sizes of 3He-based thermal neutron detectors range from a few cm in most dimensions to ones for scientific research that may approach a meter in area with a several cm in thickness. 6Li-based detectors typically disperse 6Li in various plastic scintillator materials. To achieve adequate sensitivity, 3He-based detectors frequently require operation at pressures of several atmospheres, the addition of other gases such as propane and CF4, and a range of high voltages.

3He has a large cross section of 5,330 barns for the absorption of thermal neutrons and the reaction proceeds as:

$$n+3He \rightarrow p(0.573\ MeV)+3H(0.191\ MeV)$$

While 3He has certain advantage in some implementations for achieving relatively high spatial resolution, 3He-based detection has limitations due to its limitations for making large, lightweight, and efficient thermal neutron detectors that can operate well at atmospheric pressure as well as at pressures from 0.001 atmosphere to over 5 atmospheres.

The primary limitation for 6Li-based detectors is that they typically require a solid or liquid scintillation material that results in unwanted background signals from other ionizing particles that may be present in the environment. In addition, the 6Li cross section for absorption of thermal neutrons is less than the 10B cross section for absorption of thermal neutrons.

10B has a large cross section of 3,835 barns for the absorption of thermal neutrons that can be exploited for the detection of the presence of thermal neutrons. The thermal neutron absorption reaction proceeds as:

$$94\%: n+10B \rightarrow 11B^* \rightarrow 4He(1.47\ MeV)+7Li(0.84\ MeV)+gamma(0.48\ MeV)$$

$$6\%: n+10B \rightarrow 11B^* \rightarrow 4He(1.78\ MeV)+7Li(1.02\ MeV)$$

The 11B* state lasts about 1E-12 seconds. The gamma, when present, comes from the decay of an excited state of 7Li.

Following absorption of the neutron the 4He and 7Li lose their kinetic energy by ionization loss in the surrounding material and the 0.48 MeV gamma, when present, is absorbed by the surrounding material. The occurrence of the neutron absorption on the 10B can be inferred by detecting the ionization losses of the 4He and 7Li ions or for 94% of the decays or by detecting the 0.48 MeV gamma when present. Some systems do both. For example, in some media the ionization losses produce light that can be detected by photon detectors such as photomultiplier tubes, solar blind photomultipliers, silicon photomultiplier (SiPM) arrays, large area avalanche photodiodes (LAAPD), etc. MWPCs, GEMs, straw tube and linear strip detectors that collect the ion pairs created in the surrounding media can also be used Position and time sensitive fast neutron detectors often employ scattering (also known as recoil) methods where the fast neutrons scatter from light nuclei, such as protons or helium (4He), to produce the respective recoiling protons or helium ions that then ionize the surrounding materials. The ionization energy is then detected by scintillation or proportional counters. Issues with this methodology include relatively low efficiency and background noise from the inclusion of relatively low energy, i.e. slow, neutrons and other particles in the signal. Thermalizing fast neutron detectors infer the existence of fast neutrons by first slowing the fast neutrons in hydrogen-rich moderators and then detecting the thermal neutrons. All of these methods also have issues with eliminating gamma ray backgrounds through a variety of techniques to include pulse shape discrimination. In addition, the thermalizing methods also spread the signal that can be much less than a microsecond to time periods of many tens to hundreds of microseconds. In addition, methods that rely on producing thermal neutrons for fast neutron detection have backgrounds from the presence of other thermal neutrons that are typically present. Fast neutron fission chambers are available that typically use proportional counter technology. They have good rejection of gamma rays and when made with 238U as primarily sensitive to fast neutrons. The neutron fission chambers may have good timing resolution, but typically are limited in spatial resolution and total cross section.

BRIEF SUMMARY

A major challenge for neutron detection is to have a cost effective yet sufficiently-sensitive detector that provides both spatial and temporal information over a very broad range of volumes to include sub-cubic centimeter to many cubic meters. In addition, the detector should have excellent rejection of background radiation such as gamma rays and be able to discriminate thermal neutrons from fast neutrons. The preferred neutron detector's spatial and temporal resolutions in some embodiments should be sufficient to provide information on the energies of the thermal and fast neutrons.

Boron nitride nanotubes (BNNTs) provide a mechanism to finely distribute 10B in a scintillating gas, liquid, or solid. Neutrons are detected in a four step process: 1) absorption of the neutron on 10B (the Event); 2) decay of the resultant excited state 11B*; 3) 4He and 7Li decay products ionize the scintillating gas, liquid, or solid; and 4) detect the resultant scintillation photons and/or ion pairs.

In the case of fast neutrons, 238U is used as an energy selector sensitive to fast neutrons with energies above 0.5 MeV. BNNT or BNNT coated with polymers can be used as a scaffolding to finely distribute atoms of 238U. In addition, thin wires and/or sheets of 238U, typically in the form of alloys of 238U, can be used to distribute the 238U atoms. Fast neutrons absorb on the 238U and resulting in a fission reaction that releases significant energy. Photon and/or ion pair sensitive detectors of appropriate sensitivity and structure are used to detect the time and location of the fast neutron Event.

Some embodiments may take the form of a BNNT based neutron detector. The detector may include a chamber, at least one photon detector positioned in the chamber, a BNNT material positioned in the chamber, and a scintillating material in the chamber. Scintillating materials are generally known in the art. The photon detector may be positioned to detect neutrons entering the chamber. For example, the photon detector may detect at least a portion of photons emitted from ions traversing the scintillating material produced by neutron absorption in the chamber. The chamber may include at least one mirror surface, such as aluminum, positioned to reflect photons toward the at least one photon detector.

The BNNT material may be in one or more forms, such BNNT aerogels, wires, rods, and sheets. In some embodiments particularly suited for thermal neutron detection, the BNNT material may include an enhanced fraction of 10B. For example, the BNNT material may be formed from a boron feedstock having an enhanced fraction of 10B. Depending on the form of the BNNT material, some embodiments may include a scaffolding, to stabilize the BNNT material within the chamber.

The scintillating material may take various forms, and in some embodiments may be present in more than one form. For example, in some embodiments the scintillating material may be dispersed in the BNNT material. In some embodiments, the BNNT material comprises a scintillating material coating. Some embodiments may include a scintillating gas disposed within the chamber. In some embodiments, the BNNT material may be positioned in a scintillation gas. The scintillation gas may be, for example, at least one of nitrogen, helium, neon, argon, krypton, and xenon. In some embodiments, the BNNT material may be suspended in a non-scintillating liquid within the chamber.

BNNT material may be configured in various manners. For example, BNNT material may form layers or grid-like structures. As one example, BNNT material may be arranged in various planes to form a series of planar structures, such as successive sheets or wire grids. As another example, BNNT material may be in the form of wires in spaced layers, such that the orientation of wires in successive layers is generally orthogonal.

Some embodiments particularly suited for fast neutron detection may include a 238U material, which may be, for example, a 238U alloy. The BNNT material may provide scaffolding for the 238U material. In such fast neutron embodiments, the BNNT material may be formed from a boron feedstock having an enhanced fraction of 11B.

Some embodiments may take the form of methods of detecting neutrons. Generally, the method may include detecting at least a portion of photons emitted from ions traversing a scintillating material produced by neutron absorption in a chamber having BNNT material. It should be appreciated that the various features described herein may be incorporated into the disclosed methods of detecting neutrons.

Some embodiments may take the form of a BNNT based neutron detection system. The detection system may include a plurality of BNNT based neutron detectors, as described above.

DESCRIPTION

Disclosed herein are thermal neutron detectors, and methods for neutron detection, incorporating Boron Nitride Nanotubes. BNNTs can be used to provide 10B-based thermal neutron detection in large volumes, with high efficiency at atmospheric pressure, as well as from 0.001 to 5 atmospheres and with photon detectors that can operate at voltages below 100 volts as well as with photon detectors that operate at high voltages, e.g. voltages from 100 volts to 5,000 volts. In particular, high quality BNNTs, such as those produced by the high temperature, method have few defects, no catalyst impurities, 1- to 10-walls with the peak in the distribution at 2-walls and rapidly decreasing with larger number of walls. BNNT diameters typically range from 1.5 to 6 nm but may extend beyond this range, and lengths typically range from a few hundreds of nm to hundreds of microns but may extend beyond this range. For the as-produced BNNT material, high quality high temperature method BNNTs typically make up about 50% of the bulk material and may have impurities of boron, amorphous BN and h-BN. These impurities for the as-produced BNNT material are typically a few 10s of nm in size or less but may extend beyond this range. The production parameters of the high temperature process can be adjusted to have more or less boron as compared to the amorphous BN and h-BN impurities. Having less boron typically increases the optical transparency of the bulk BNNT material. Various purification processes can be used to increase the amount of BNNTS as compared to the boron, BN and h-BN impurities. For estimates in this disclosure, the typical as-produced material will be considered, and the fraction of boron only impurity will be considered negligible, i.e. for BNNT Material all of the material will be considered to be some form of BN. The BNNT-based neutron detection process works equally with material at higher levels of BNNT purity where the boron, BN and h-BN impurities have been reduced or eliminated. Thus, it should be appreciated that the apparatus and methods disclosed herein are not intended to be limited to a particular quality of BNNT materials, unless it is explicitly stated herein.

Figure 1:
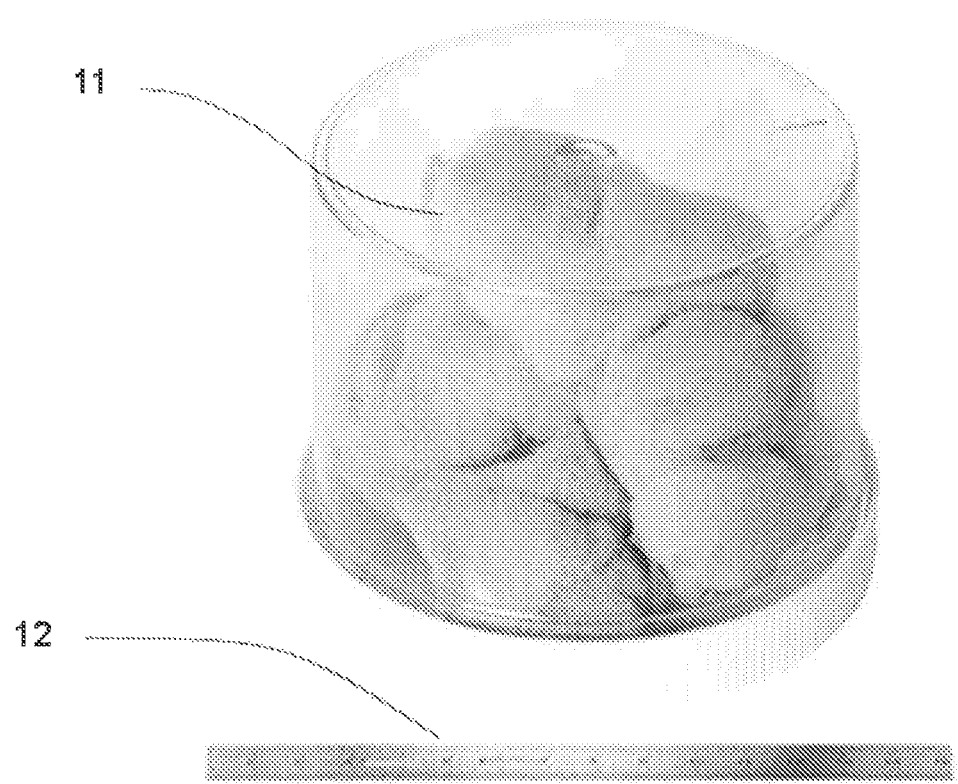
FIG. 1 shows as-produced BNNT Material.

The density of the as-produced high temperature method BNNT Material is typically roughly 0.5 grams per liter (0.5 g/L) and easily varies by +/−50%. This value of the "tap density" can be compared to the density 2,100 g/L for h-BN. FIG. 1 shows a photograph of BNNT Material 11 produced using a high temperature method. The as-produced high temperature method BNNT Material 11 has the appearance of a "puff ball" or "cotton ball" as shown in FIG. 1, in which the BNNT Material is typically on the scale of several centimeters to several tens of centimeters 12. The BNNT material 11 can easily be compacted.

A BNNT aerogel material can be produced where the tap density is less than the 0.5 g/L density of BNNT material produced by a high temperature method. There are many possible methods for generating a BNNT aerogel material. One example is to: 1) suspend the BNNT Material in a solvent, such as ethyl alcohol; 2) lightly sonicate the suspension; 3) evaporate the liquid from the suspension leaving just the low density aerogel BNNT Material. BNNT, BN and h-BN are stable in air to over 900 C, so heat can be used. However, the small amount of boron present may react with oxygen and possibly nitrogen at temperatures above around 900 C used. The resultant boron oxide can be removed by rinsing with distilled water. The evaporation of alcohols, water, and similar materials can be done in vacuum, air, or nitrogen.

BNNT Material can be made starting with a boron feedstock consisting of natural boron, 10B, and/or 11B. It should be appreciated that boron feedstocks are available with varying fractions of natural boron, 10, and 11B. Some boron feedstocks are available with an enhanced fraction of either the 10B or the 11B isotope, and are frequently referred to as "enriched" in the desired isotope. For purposes of this disclosure, there is generally no difference in the synthesis process, or the properties of the resulting BNNT Material, other than the slight increase of about 6% in mass in going from pure 10B to pure 11B. BNNT materials produced using natural boron, 10B, and 11B resemble the material shown in FIG. 1.

Figure 2:
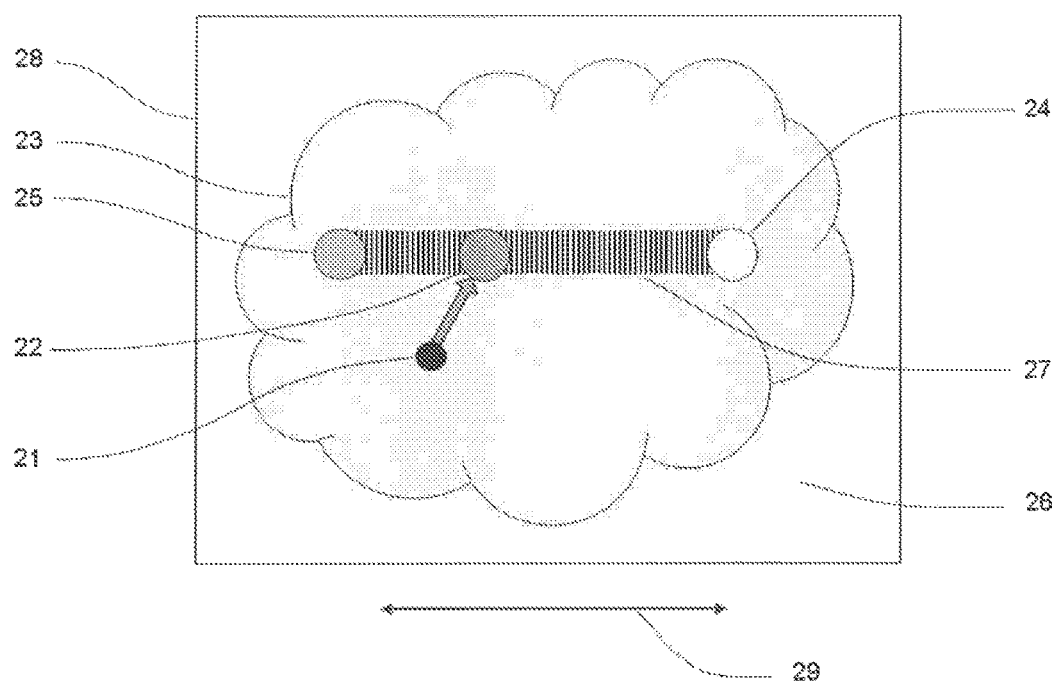
FIG. 2 illustrates a neutron being absorbed on a 10B in the BNNT Material and emitting light in the surrounding scintillation material.

As illustrated in FIG. 2, when a neutron 21 interacts with a 10B 22 in a BNNT or the boron, amorphous BN or h-BN impurities in the BNNT Material 23, 4He ion 24 and 7Li ion 25 (and possibly gamma) are produced and travel into the surrounding BNNT Material 23. The BNNT, boron, amorphous BN and h-BN in the BNNT Material 23 are minimally changed or impacted as long as the fraction of material interacted with does not become significant. The 4He 24 ion gains electrons and remains as a mobile gas species in the scintillation gas, liquid or solid, whereas the 7Li 25 may bond to the BNNT, boron, amorphous BN and h-BN or in some cases bond to the surrounding scintillation material if it is other than a noble gas or nitrogen gas. The 7Li bonding has little impact, if any, on the boron species, provided that the boron species bonded with 7Li represents a small (<0.1%) fraction of the bulk material and typically is much less than this amount. The 7Li 25 may alternatively interact with the surrounding gas or other material that may be present in containment volume 28. The 7Li ion interaction might become an issue if the amount of neutrons being absorbed, i.e. the number of Events, was extremely high, as in the case of placing the detector in close proximity of a nuclear reactor core. Note, for some BF3 systems there is a related issue of fluorine atoms releasing that can interfere with some modes of detecting the decay signals. The fluorine atom release can become an issue for BF3 at relatively lower number of Events as compared to BNNT-based detectors. The 0.48 MeV gammas are very penetrating to most materials, and largely escape any detector not explicitly designed to stop them.

In some embodiments, detection of 4He ion 24 and 7Li ion 25 produced in the neutron 21 absorption on 10B 22, the Event, can be achieved in a two-step process: 1) surround the BNNT Material 23 and any boron, amorphous BN, and h-BN impurities, with a scintillating material 26, such that as the 4He 24 and 7Li 25 ions lose energy through ionization, in the scintillating material light is emitted along the ionization path 27; and 2) collect the emitted light and convert it to an appropriate electronic signal. The scintillating material 26 can be a solid, liquid, or gas. The 4He 24 and 7Li 25 ions may lose some of their energy in the BNNT Material 23 with its boron, amorphous BN, and h-BN impurities. In some embodiments, the thermal neutron detector will be designed such that most of the ionization occurs in the scintillating material and relatively small amounts of the ionization occur in the BNNT Material 23 itself. The ratio of ionization in the BNNT Material compared to the scintillating material is controlled by the ratio of the respective masses of material present with some adjustment for the atomic numbers of the materials.

Embodiments may be configured to decrease the impact of background noise. For example, cosmic rays provide a background of energetic muons at a rate of roughly 1 per 70 m^2 per second-sr with some variation depending on elevation, latitude, etc. These cosmic rays typically lose about 2 MeV in ionization energy for every gram/cm^2 they pass through. This means that if the 10B were in a 1 cc cube of plastic or liquid scintillator, there would be a background signal mimicking the signal from the neutron capture on 10B about once every minute. Some embodiments of a detector are generally larger than 1 cc, which may add to the complexity of extracting signal from the background. For example, a 1 m^2 detector would likely see at least over one hundred background counts per second. The resultant background rates at such surface areas may be much higher than many situations of interest can tolerate. Attempting to reduce or eliminate this cosmic rate background can partially be accomplished with an array of veto counters, as are known in the neutron detector art, but such a system may add further complexity, weight and size. In some embodiments, the BNNT Material 23 may be coated with a scintillating material. The coating may be at the molecular level, and the scintillating material may form one or more layers on the BNNT material. The scintillation-coated BNNTs may be placed in scintillation gas or suspended in a non-scintillating liquid. This is possible because BNNTs tend to attract many polymers, and polymer scintillating materials can be selected that prefer to stay bonded to the BNNTs and not dissolve into the non-scintillating liquid or the wide variety of scintillating liquids that are available.

Many environments of interest also have gamma rays present. Most liquid and solid scintillators have moderate to high levels of sensitivity to gamma rays that can be a further source of background noise. When combining BNNTs into liquid and solid scintillators, the scintillating materials chosen can minimize detector's sensitivity to gamma rays to some degree depending on the energies of the gamma rays.

The cross section area of one mole of 10B (10 g) is 6.022E23×3,835 barns=0.23 m^2 where 1 barn–1E-28 m^2. In embodiments, 10B atoms would be distributed throughout the three-dimensional volume of the detector, but even so there would be some openings through which no 10B atom may be present. However, about 10 g of 10B distributed over a 0.23 m^2 area provides a reasonable upper bound on the maximum amount of 10B per m^2 useful for thermal neutron detection. This results in approximately 40 g of 10B/m^2, or about 103 g of BN material/m^2. For simple considerations, a number of about 100 g/m^2 of BNNT Material (which includes BNNTs with small amounts of boron, amorphous BN, and h-BN)) will be used as an upper bound for a certain embodiments of a detector system as described herein. It should be appreciated that other embodiments may use larger ratios of BNNT Material, and the scope of this disclosure is not intended to be limited to this specific embodiment.

As an example, with the tap density of 0.5 g/L, a 1 m^2 detector, having a 20 cm depth, of as-produced high temperature method BNNT Material provides the upper bound.

Under these example conditions, embodiments of the thermal neutron detection scheme using BNNT Material use a scintillation material that is a gas. In these embodiments, most of ionization occurs in the gas and not in the BNNT Material. Available gases that scintillate include nitrogen and the noble gases, i.e. helium, neon, argon, krypton and xenon. In some embodiments, the scintillating gas will also produce light at wavelengths that can be conveniently detected. Most high energy and nuclear physics detectors that use gas scintillators work with argon and xenon, though some have certain amounts of helium and nitrogen. For working with BNNT Material, in the examples to follow argon will be used, but it should be appreciated that other scintillation gases may be used.

The photons emitted by the scintillation process in argon at atmospheric pressure are a combination of 9.7 eV (128 nm) VUV photons and roughly 1.3 eV (940 nm centered region) non-UV photons. The amount of ionization energy to create a VUV photon is 67.9 eV and the amount for a non-UV photon is 378 eV. Consequently, each neutron absorbed on a 10B, an Event, will generate up to 34,000 VUV photons and 6,000 non-UV photons.

The BNNT Material will mostly absorb the VUV photons, whereas the non-UV photons will be partially absorbed in the BNNT Material. Generally, reducing the amount of boron impurity in the BNNT Material reduces the absorption of the non-UV photons.

Detecting the light from a neutron absorption Event inside the BNNT Material as shown in FIG. 2 is conceptually similar to detecting a lightning bolt inside a cloud. The signal from the Event depends on: 1) the number of VUV and non-UV photons generated; 2) the number of VUV and non-UV photons transmitted through the BNNT Material (they all pass through argon); 3) internal mirror surfaces that can reflect the photons to the photon detectors for those that do not take a direct path; and 4) the efficiency of the photon detectors for detecting the VUV and non-UV photons. There is a balance between having sufficient BNNT Material to produce Events and having too much BNNT Material between the Event and the photon detector. The balance may vary depending on the particular embodiment. Also, the balance is dependent on the amount of non-BNNT impurity(ies) in the BNNT Material, especially, as indicated above, the amount of boron. For some embodiments, an approximate as the upper value for balancing Events and optical transport is around 100 g/m^2.

Argon at STP has a density of 1.784 g/L. The associated stopping distance for 4He at 1.47 (1.78) MeV is roughly 0.8 (0.94) cm or alternatively expressed as roughly 1.4 (1.7) mg/cm^2 and the stopping distance for 7Li at 0.84 (1.02) MeV is roughly two thirds these values. For BN materials including BNNT the stopping range is roughly 0.9 (1.1) mg/cm^2. As the 4He and 7Li ions are close to traveling in opposite directions (they are exactly opposite in the case of no gamma emission), the total ionization range for the dominate gamma emitting decay is roughly 1.5 mg/cm^ of BNNT Material.

Some embodiments for detecting the neutron on 10B will have less than 1 mg/cm^2 of BNNT Materials including BNNT in at least two directions from any Event and at least 1.8 mg/cm^2 of argon, i.e. roughly 1 cm of argon as indicated by the scale 29 in FIG. 2.

There are two various considerations with respect to the combination of BNNT Material and argon or other scintillation material. The 10B preferably is sufficiently dispersed to increase the likelihood that the thermal neutrons encounter the 10B and production an Event. However, the BNNT Material and anything supporting it will absorb some of the photons originating from the 4He and 7Li ionization in the argon (or other scintillation material), and may limit observation of Events. Embodiments discussed below provide examples for balancing these considerations.

There are a number of possible detector geometries for producing and observing Events. It should be appreciated that features described with respect to an embodiment below may be incorporated into other embodiments having different geometries. In some embodiments, two general geometries for balancing the production of Events and observing Events include: 1) The BNNT Material fairly uniformly dispersed as an aerogel, and in some embodiments argon filling the space not occupied by the aerogel. The maximum density of the BNNT Material forming the aerogel in some embodiments is about 1 mg/cm^3; in such configurations the ions have roughly 1 cm of argon or other scintillation gas available. This geometry optimizes the Event generation, but in some embodiments, if the thickness of the BNNT Material becomes too great for the path to the photon detector, the overall detector performance may be limited. 2) The BNNT Material concentrated in small spheres, small diameter wires or thin sheets. In some embodiments, the average thickness of the BNNT Material location is about 1 mg/cm^2. In some embodiments, this geometry may limit the number of Events, but facilitates enhanced observation of the photons from the 4He and 7Li ionization.

Figure 3:
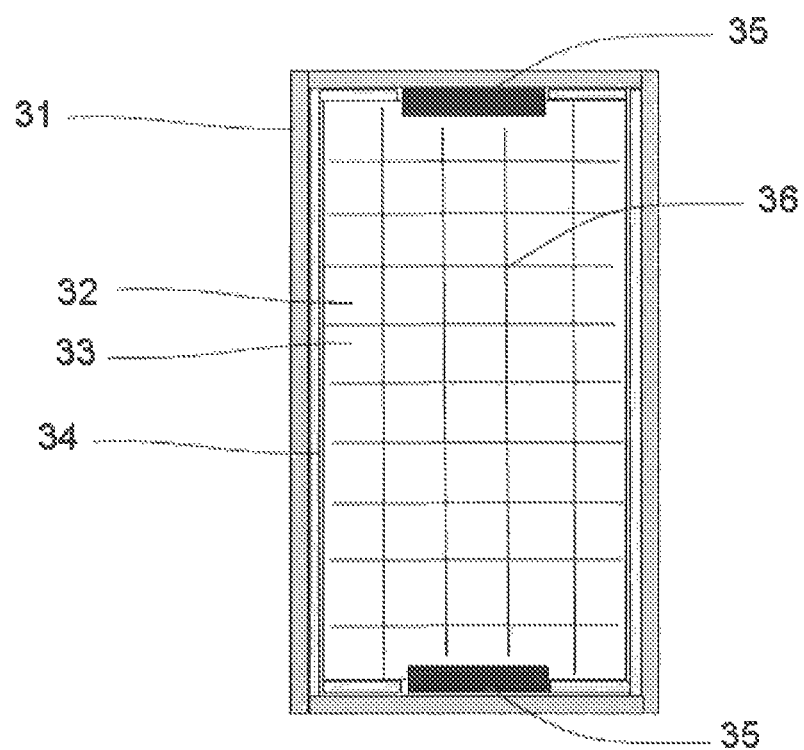
FIG. 3 illustrates a side view of a BNNT-based neutron detector.

FIG. 3 shows a thermal neutron detector with the as-produced or aerogel BNNT Material geometry according to one embodiment. The outer container 31 holds the as-produced or aerogel BNNT Material 32 and argon or other scintillation gas 33. The interior 32 of the outer container 31 is coated with material such as aluminum 34 to reflect the photons from the 4He and 7Li ionization. It should be appreciated that other materials that reflect these photons may be used. Photon detectors 35 detect the Events. The photon detectors may have a wavelength shifting material to convert the 9.7 eV (128 nm) VUV, if argon) photons to lower energy photons as required by the photon detector 35. A wide range of photon detectors 35 are available, such as photomultipliers, solar blind photomultipliers, SiPMs, LAAPMs, etc. Choices depend on, for example, geometries, costs, weight and the preference not to require high voltage supplies. As the as-produced or aerogel BNNT Material tends to self-attract, a fine wire mesh scaffolding 36 may be used in some embodiments to stabilize the BNNT Material 32. In some embodiments, the fine wire mesh 36 may have a very small optical cross section and a small cross section for the 4He and 7Li ions.

As described in the discussion for FIG. 2, the neutrons are absorbed by the 10B in the BNNT Material 32 resulting in the 4H4 and 7Li ions producing light in the surrounding scintillating gas 33. The scintillation light travels directly to the photon detectors 35 or bounces off one or more of the reflective surfaces 34 on the way to the photon detector. While the materials present may absorb some of the scintillation light, sufficient light reaches the photon detectors 35 to indicate the Event. In some embodiments multiple photon detectors 35 may be present and some of them may be put in coincidence as a method for reducing backgrounds.

Figure 4:
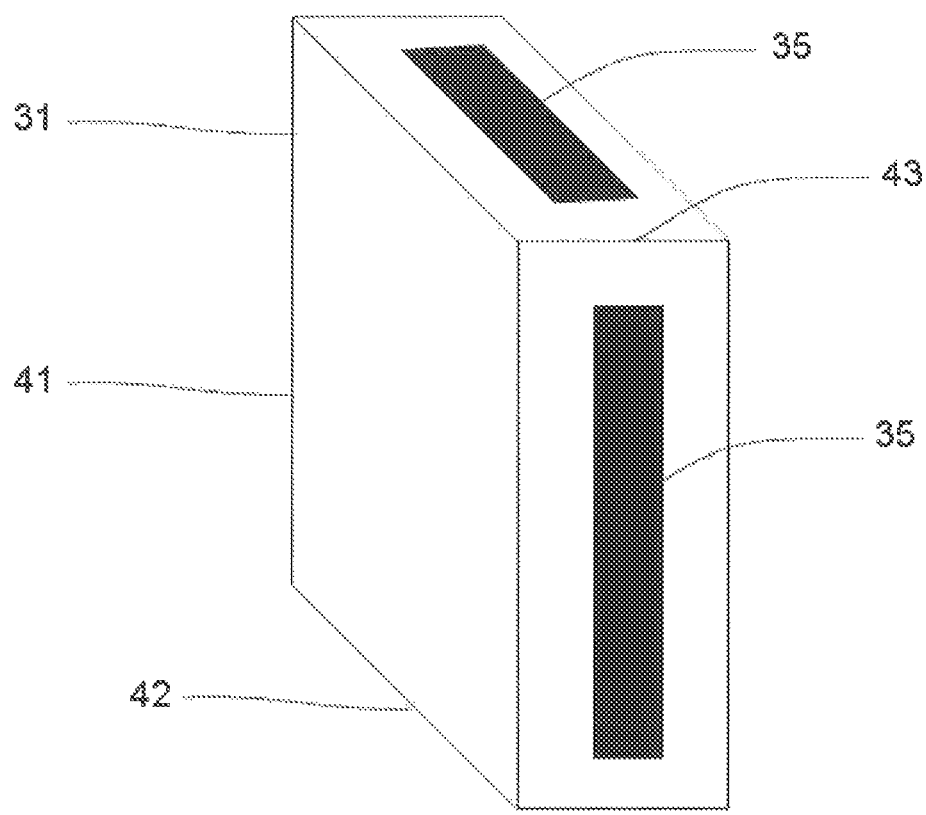
FIG. 4 illustrates a 3-D view of a BNNT-based neutron detector.

FIG. 4 shows a 3-D view of the embodiment of the thermal neutron detector 31 shown in FIG. 3. It should be appreciated that the height 41, length 42 and thickness 43 can be varied to address the conditions described above for thickness of the BNNT Material and observation of the photons. Multiple photon detectors 35 as shown in FIG. 3 can be used in various multi-layer or multi-detector embodiments.

Figure 5:
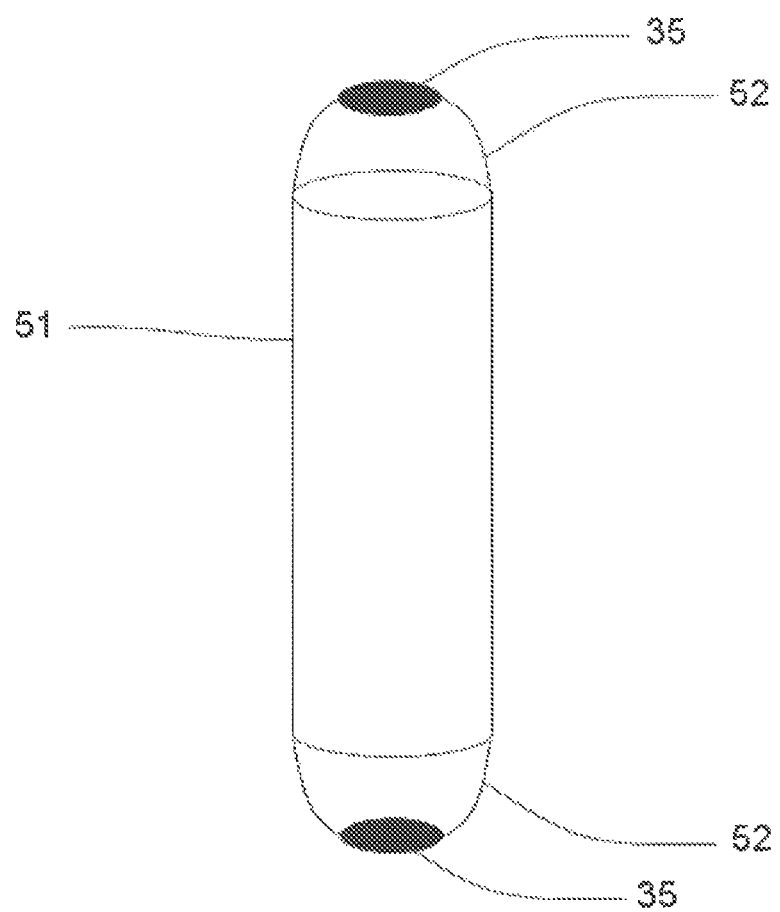
FIG. 5 illustrates a cylindrical shaped BNNT-based neutron detector.

FIG. 5 shows a cylindrical aerogel geometry detector 51 according to one embodiment, in which Winston cones 52 are placed on the ends of the detector 51 to help focus the photons so that smaller photon detectors 35 (not shown) can be used.

Figure 6:
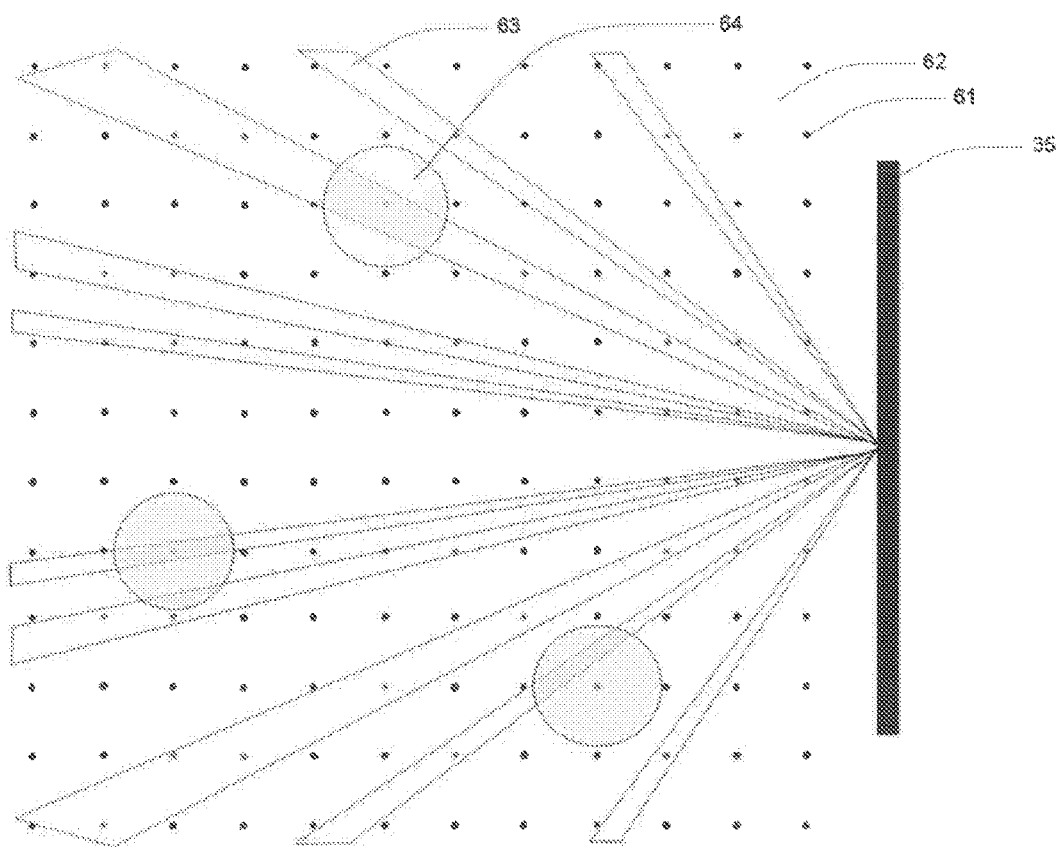
FIG. 6 illustrates a BNNT grid-based neutron detector.

FIG. 6 shows an example of utilizing BNNT Material in a wire or thread 61 configuration from the perspective along the direction of the wires or threads. In this embodiment the wires or threads 61 are about 1.0-1.2 mm in diameter and spaced about 1 cm from each other so that the 4He and 7Li ions can escape the wires or threads 61 and enter the argon or other scintillation gas 62 surrounding the wires 61. The BNNT Material wires or threads 61 can be positioned in all three directions, i.e. length, width and height. In this embodiment, the wires or threads 61 are at least about 1 mm in diameter, so that the neutrons have a good probability of intersecting a wire or thread 61, and the density of the wires or threads 61 is such that the cross sectional mass is below the about 1 mg/cm^2 ratio. As an example a one liter volume of 1,000 1 mg/cm^2 1.2 mm diameter wires or threads 61 spaced on a 1 cm grid would have 1 gm/L of BNNT Material roughly matching the maximum optimal condition for absorbing thermal neutrons as discussed above. For the photon detector 35 to observe the neutrons, the arrangement of the wires or threads preferably allows observation of most of the Events. For the conditions of this example, the shadow paths 63 of the wires or threads 61 to a given point on the photon detector 35 are shown. Also shown are the 1 cm radii 64 of the ionization paths of the 4He and 7Li ions that produce the photons. A rough estimate is that half of the photons from scintillation locations from an Event throughout the volume are observable by most locations of the photon detector 35. The BNNT Material wires or threads 61 may in some embodiments include fine wires, not shown, of other material within the BNNT Material to assist in mechanical support. Small wires below one tenth the diameter of the BNNT Material wires or threads will not interfere with the detection of the thermal neutrons.

In some embodiments, the BNNT Material wires or threads 61 may be replaced by BNNT Material spheres strung along fine wires. Generally, the spheres are be about 3 mm in diameter to achieve the same geometric conditions and to have consequently lower average density of BNNT Material to achieve the 1 mg/cm^2 threshold described above. It should be appreciated that other diameters may be appropriate in different embodiments.

Figure 7:
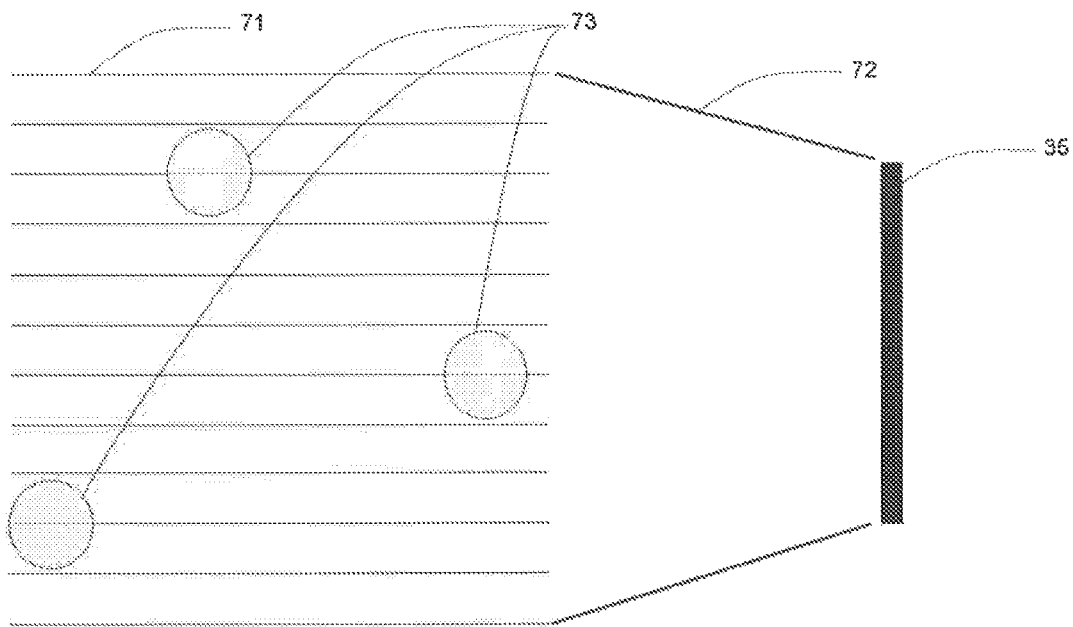
FIG. 7 illustrates a BNNT planner-based neutron detector.

FIG. 7 shows an embodiment in which BNNT Material sheets 71 are used in similar fashion as the BNNT Material wires or threads 61. In this embodiment, the sheets 71 may have an average thickness of about 1 mg/cm^2, and the spacing between sheets may be about 1 cm. Photons from Events 73 headed along the sheets are detected by the photon detector 35. A reflective cone 72 can be used to reduce the size of the photon detector 35.

Figure 8:
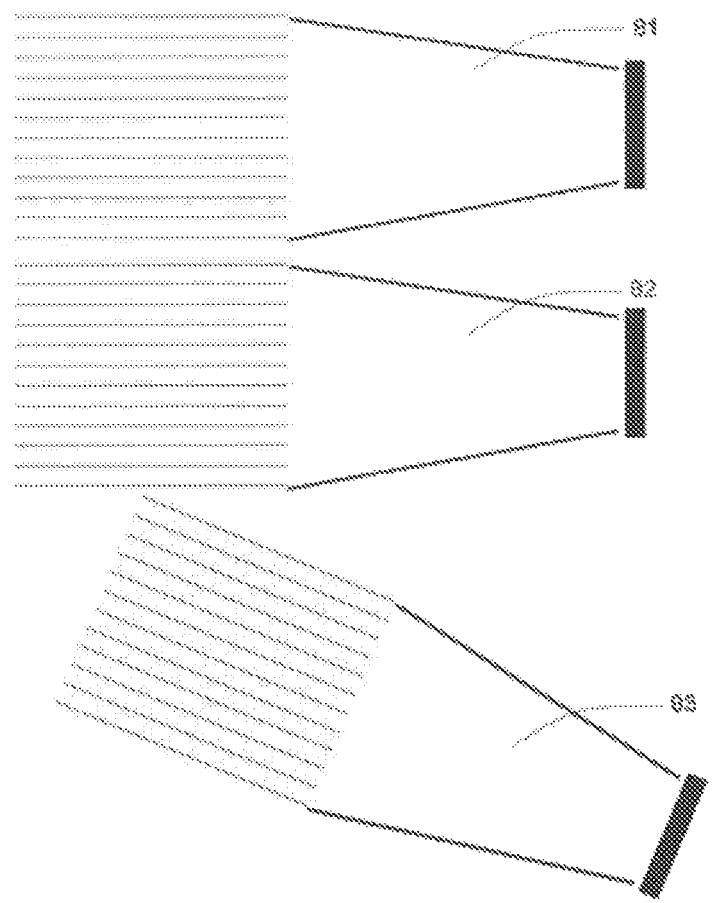
FIG. 8 illustrates multiple geometries of a BNNT planner-based neutron detector.

FIG. 8 shows a plurality of detectors 81, 82, and 83 joined together to form an expanded detector. Each detector 81, 82, and 83 may comprise a detector such as shown in FIG. 7. The relative arrangement of each detector may be varied depending on the embodiment. For example, in the embodiment shown, detector 83 is tilted such as to enhance the sensitivity of the detector with respect to thermal neutrons that originate from a direction other than from the left side of the Figure.

Figure 9:
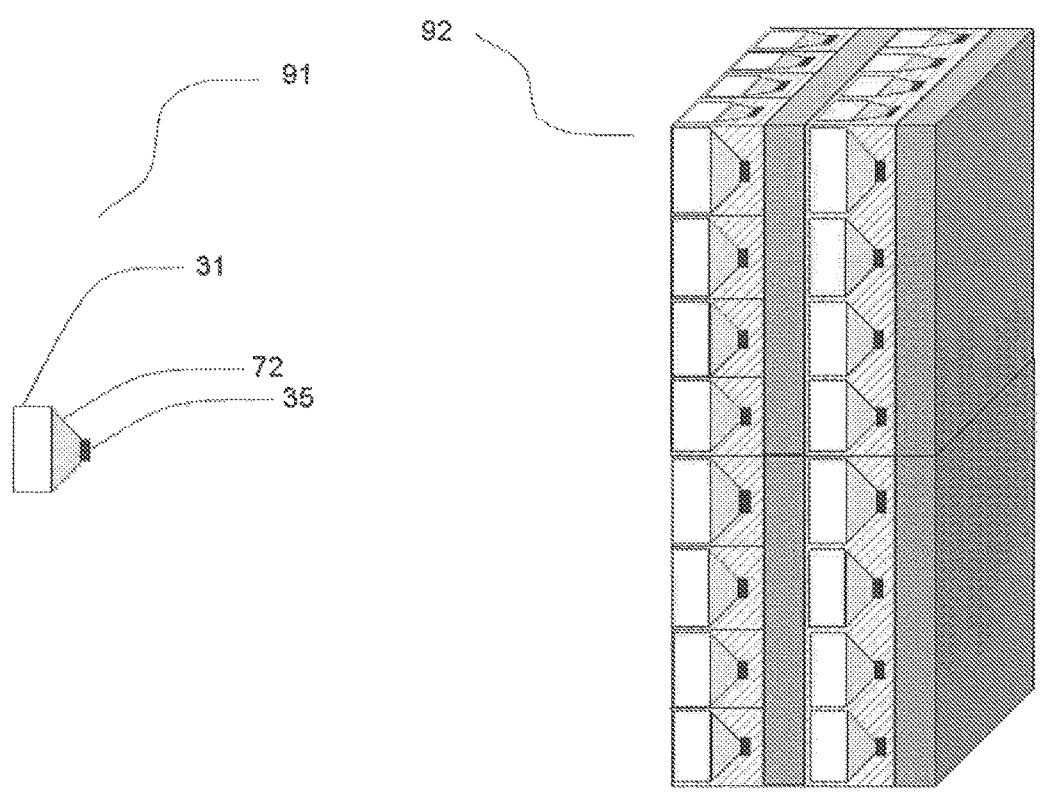
FIG. 9 illustrates a large highly segmented BNNT-based neutron detector.

Some embodiments may comprise an expandable ensemble of small detectors. FIG. 9 shows the overall volume 31 and light sensor as shown in FIG. 3, and a light cone 72 as shown in FIG. 7 forming the basic unit of an expandable ensemble 92 of smaller detectors 91 combined to form a multilayer plurality of detector elements. Detectors 91 may comprise, for example, detectors as shown in FIGS. 3 and 7, including the as-produced or purified or aerogel BNNT Material 32 and argon or other scintillation gas 33. Detectors 91 may include a light focusing element 72 as shown in FIG. 7, and a photon detector 35 as shown in FIG. 3. The parameters of the smaller detectors 91 can be adjusted along with the number of layers, rows, and columns in the ensemble to optimize the embodiment. The expandable ensemble 92 provides spatial information at the level of the size and location of the smaller detectors 91 for the distribution of the source(s) of thermal neutrons.

As one of ordinary skill should appreciate, there is flexibility in the design of the size, shape, and arrangement of the BNNT Material for a given thermal neutron detector apparatus. In some embodiments, the shape and arrangement of the BNNT Material and photon detector fit into a portable suitcase detector system, for example. In other embodiments, the shape and arrangement of the BNNT Material and photon detector may be configured for use in a system that thermal neutron detection emanating from an 18-wheeler or shipping transportainer. BNNT materials coated with scintillating material, or suspended in a scintillating liquid, gas, or solid, permit the use of numerous shapes and configurations. Additionally, the mechanical and chemical (stability) properties of BNNT Material, the ability to distribute 10B in the BNNT Material, and the ability to exclude non-10B material, creates numerous advantages for BNNT-based neutron detection systems.

The shapes and geometries discussed above work to optimize the generation and observation of Events. In addition, these shapes and geometries meet the goal of having minimum sensitivity to cosmic rays, background gamma rays, and high energy x-rays. For example, for a typical cosmic ray to deposit 1 MeV of energy would take roughly 280 cm of argon as used in some embodiments, a length much longer than the active region for Events for a typical portion of even a large detector system. Consequently, the system will have a good signal to noise level for non-thermal neutron generated Events, though the energy resolution for detecting the ionization energy deposited by the 4He and 7Li will be moderate. This is not an issue for detecting the amount of thermal neutrons present in a given environment.

The photon pulses produced in 1 atmosphere argon or other scintillation gases by the 4He and 7Li ionization are typically a few hundred nanoseconds in duration. The photon pulses may be shortened by the introduction of nitrogen gas in some implementations for the purpose of increasing the rate of Events and reducing the dead time. Individual Events may be detected through integration of the electronic pulses from the photon detectors over the pulse duration. For neutron detectors, and in particular large area detectors, one goal is to identify low levels of thermal neutrons with moderate spatial resolution. The Event integration time method is effective for detecting low levels and allows for a favorable signal to noise level.

Cosmic ray interactions with the atmosphere and materials near the surface of the Earth are the primary source of thermal neutrons on the surface of the earth known as the ambient background of thermal neutrons. This thermal neutron flux is roughly 50-80 neutrons/m^2/s but can vary significantly depending on surrounding material. This ambient background can be utilized to demonstrate the sensitivity of thermal neutron detectors.

Figure 10:
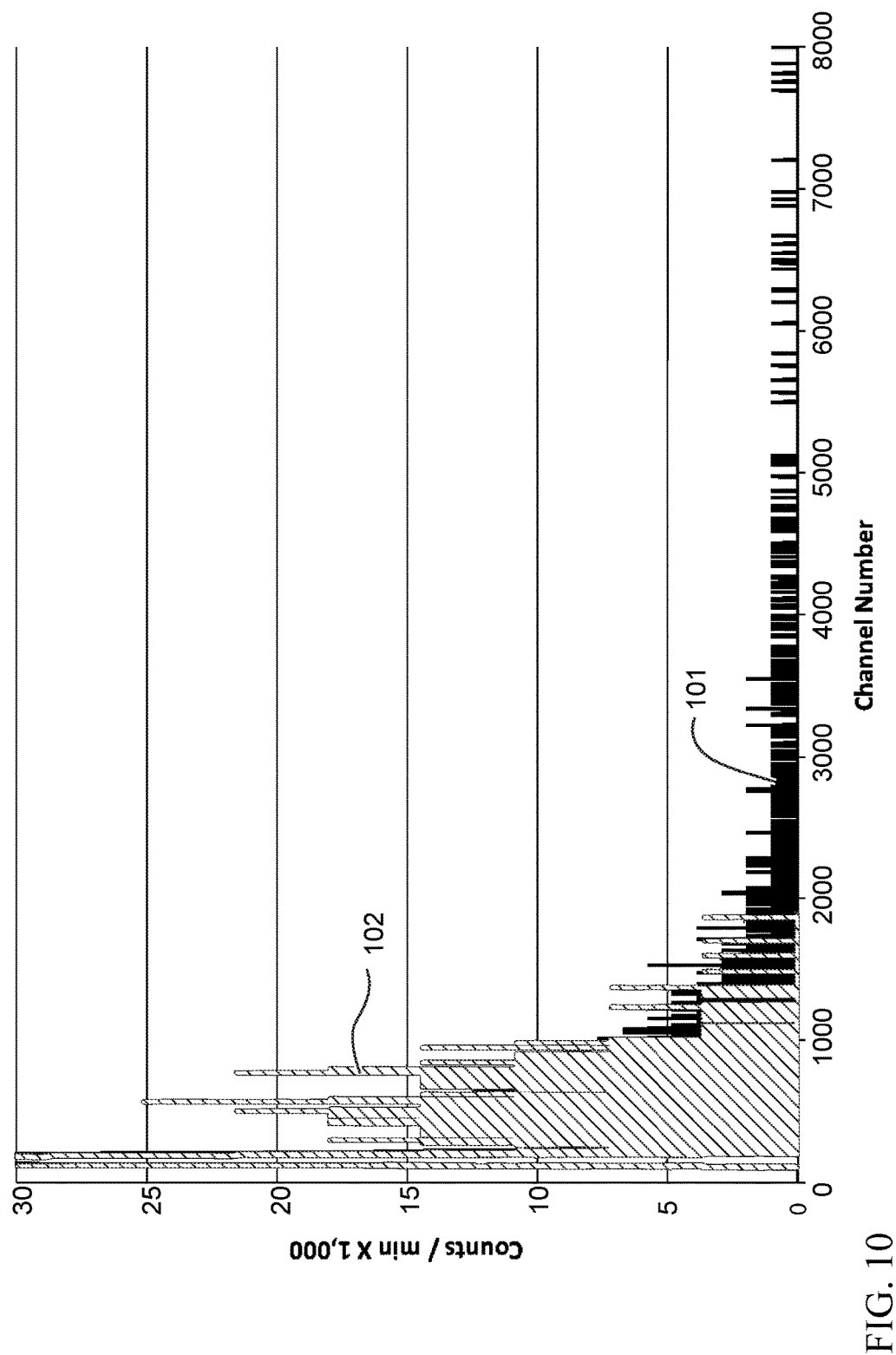
FIG. 10 shows data from a BNNT-based neutron detector with xenon scintillation gas.
Figure 11:
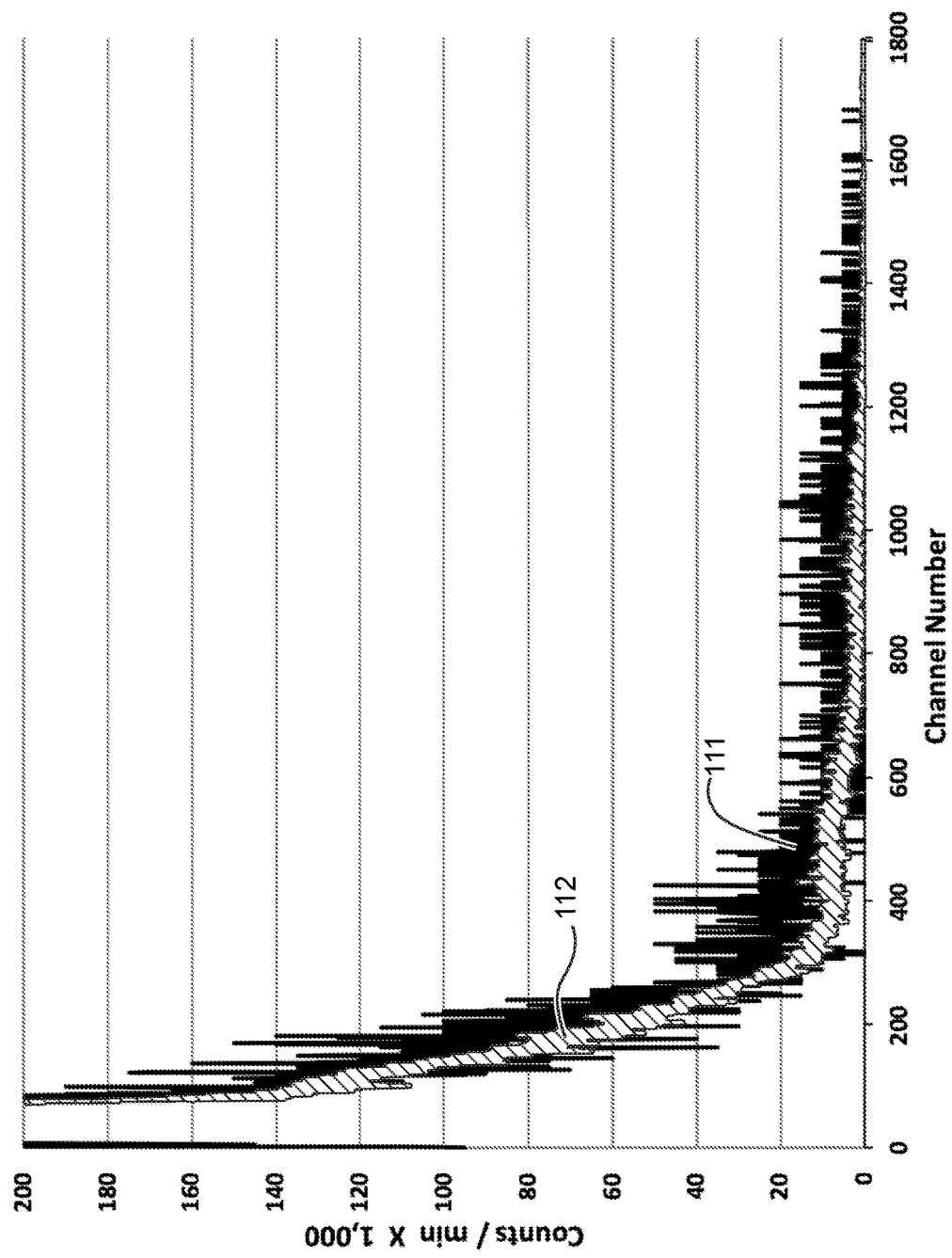
FIG. 11 shows data from a BNNT-based neutron detector with nitrogen scintillation gas.

FIG. 10 shows results for detecting ambient thermal neutrons from placing BNNT Material in a xenon gas environment and detecting the scintillation light in a photomultiplier tube. A simple aluminum box was used to hold the BNNT Material and the photomultiplier tube. The spectrum 101 with the detector unshielded by borax is seen to be separable from the spectrum 102 where a layer of borax shielded the detector. The 10B in the borax when present provided shielding from the ambient thermal neutrons. FIG. 11 shows results for detecting ambient thermal neutrons from placing BNNT Material in a nitrogen gas environment and detecting the scintillation light in a photomultiplier tube. The same aluminum box and photomultiplier tube was utilized as in the xenon gas measurement. The spectrum 111 with the detector unshielded by borax is seen to be separable from the spectrum 112 where a layer of borax shielded the detector from the ambient. Both of these test embodiments demonstrate that the BNNT Material in a scintillation gas can successfully be used to detect thermal neutrons thereby justifying further development of the technology.

Figure 12:
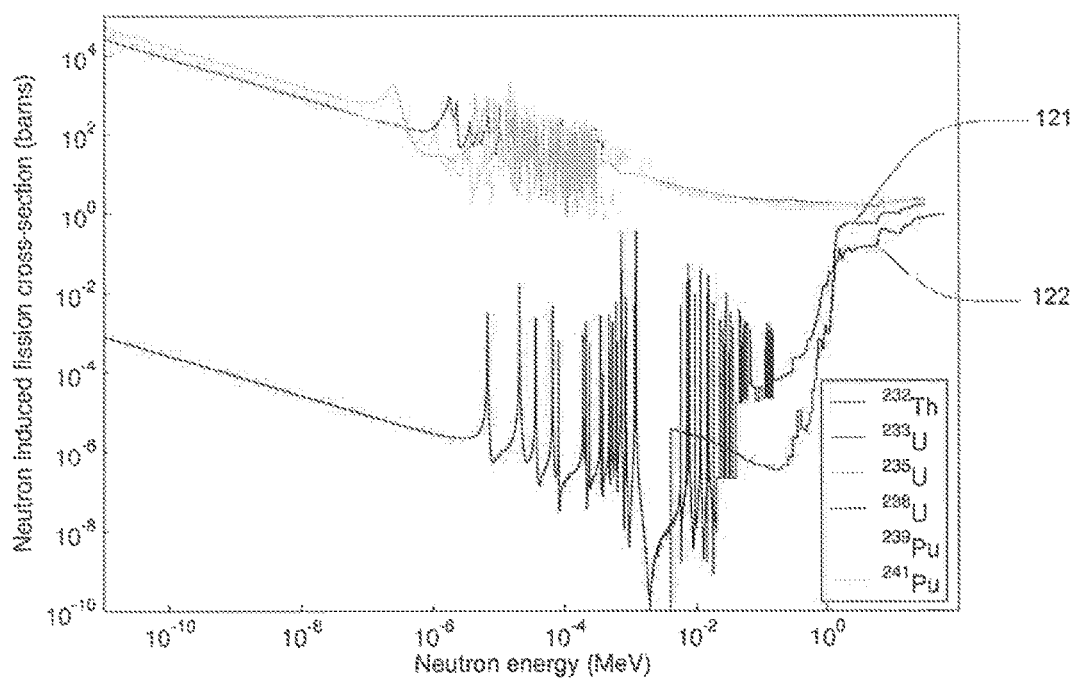
FIG. 12 shows fission cross sections for neutron capture for a number of fissionable materials.

The uranium isotope 238 (238U) can be used to provide a selection filter to separate fast neutrons from slower neutrons and thereby create a fast neutron detector. FIG. 12 shows the fission cross section of 238U 121 and several other fissionable isotopes from near zero energy to near 30 MeV. For 238U the cross section raises three orders of magnitude in going from 0.5 to 1.5 MeV. Thermal and slow neutrons below roughly 1 MeV contribute almost nothing to the 238U fission cross section. Fast neutrons above roughly 1 MeV provide almost all of the 238U fission events.

As seen in FIG. 12, the thorium isotope 232 (232Th) also has a very rapid rise in cross section 122 in this region, however its fission cross section is approximately 4 to 5 times lower in the fast neutron region when compared to 238U. Thus, although embodiments described herein employ 238U, it should be understood that 232Th may be used as a selection filter for a fast neutron detector in the present approach, but in embodiments may not be as efficient as 238U. The other isotopes shown in FIG. 12 generally would not work in the present approach, because they have large fission cross sections for the slow neutrons including thermal neutrons and thereby do not provide the selection filter for fast neutrons.

238U fission events are energetic with approximately 160 MeV of energy going into the two fission ions created in the event. The balance of the fission energy goes into neutrons, neutrinos, etc., that are typically not detected. The two fission ions share their energy based on the ratio of their masses and deposit their energy by ionizing the material near them. Usually this is into adjacent 238U material and difficult to detect. By having very little or no 238U adjacent to the fission event, this ionization energy can be detected if an appropriate scintillation or ionization material is present and the light or ionization energy is detected by scintillation counters, proportional counters, or similar counters.

Figure 13:
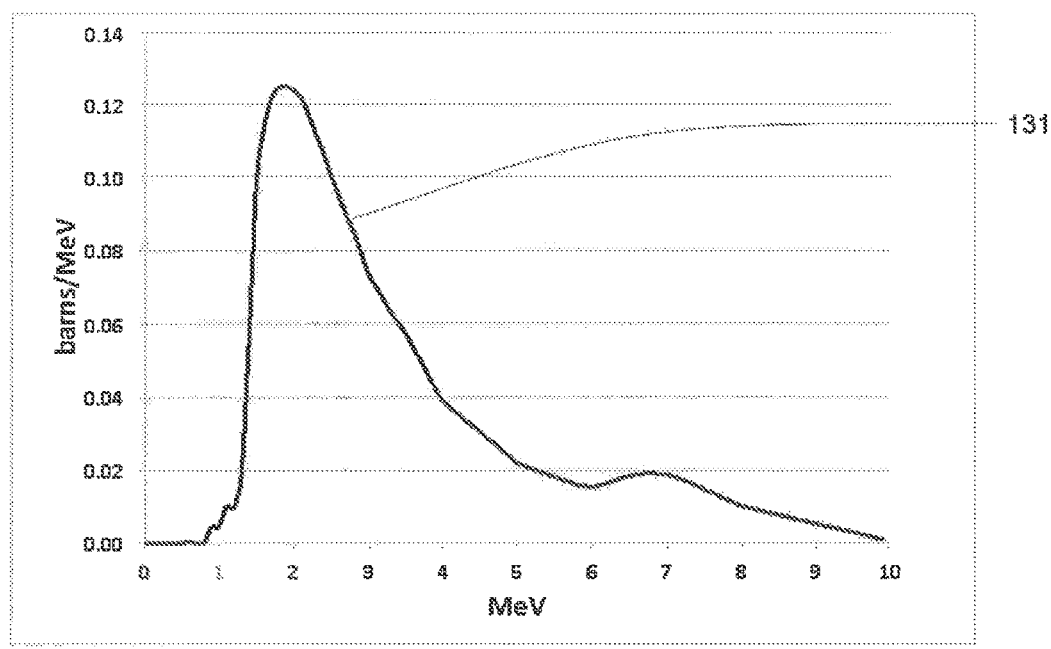
FIG. 13 shows the absorption cross section for thermal and fast neutrons on 252Cf.

The total thickness of the detector depends on the desired efficiency of detection for a given source of events. 252Cf and 235U produce very similar spectra of decay or fission neutrons. When these spectra are folded with the energy-dependent cross section of 235U the detection cross section 131 shown in FIG. 13 is observed. The integrated cross section is approximately 0.3 barns and the peak is at 1.9 MeV neutron energy. There is almost no contribution to the cross section for neutrons below 1.0 MeV. If an americium-beryllium (AmBe) source with its increased number of higher energy neutrons is considered, the integrated cross section is slightly more than 0.5 barns. If the fast neutrons are in a specific energy range above 6 MeV the cross section can exceed 1.0 barns.

The overall detector apparatus can have almost any geometry. In some embodiments, a detector may be assembled from multiple containers, as described below. In such multi-layer or multi-detector embodiments may include containers that are same in size and shape, or different if desired for the particular embodiment. The size of individual containers can vary from less than a centimeter to many 10 s of centimeters. Rectangular containers will be used in the discussion herein, but it should be appreciated that other embodiments may be cylindrical, hexagonal, etc., in shape.

Figure 14:
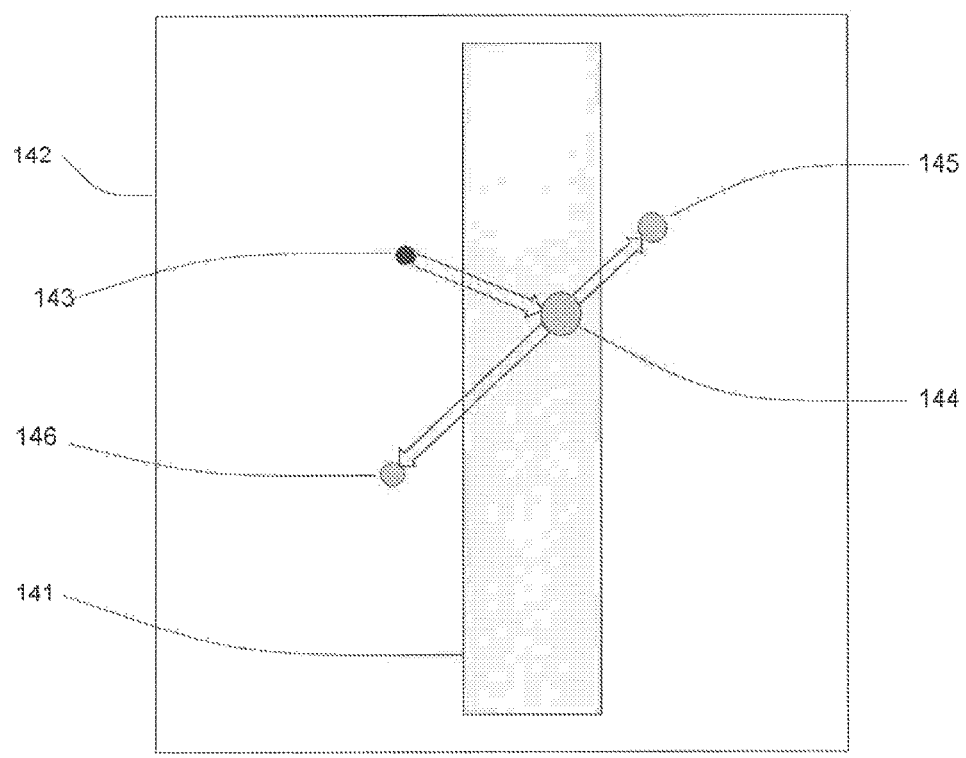
FIG. 14 illustrates the absorption of a fast neutron on 238U in a wire.

FIG. 14 illustrates an embodiment of a fast neutron detector in which one or both of the fission ions can release a substantial fraction of their energy into scintillation or ionization materials. Container 142 comprises an airtight sealed volume with selected gases and detector elements (not shown) inside, and with appropriate electrical feedthroughs for signals and power. Wires, filaments, or surfaces 141 mostly comprised of 238U or BNNT Material that is serving as a scaffold for the 238U are placed into the interior of container 142. A fast neutron 143 encounters a nucleus of 238U 144 and undergoes fission. The two fission ions 145 and 146 have sufficient energy to escape the 238U wire, filament, or surface 141 for a large fraction of the Events and deposit most of their energy in the surrounding scintillation or ionization materials in container 142 if the wire, filament, or surface 141 is sufficiently small in diameter or thickness. For example, if the wire or filament 141 is metallic and is 5 microns in diameter, roughly 50% or more of the 160 MeV ionization energy available will be deposited outside of the wire or filament 141 for approximately 80% of the events.

Uranium does not have great tensile strength and will chemically react in some environments. However, if uranium is alloyed with other materials such as niobium, molybdenum, and/or zirconium, the resultant alloy is strong and minimally chemically reactive. For example, if about 6% niobium is alloyed with 94% uranium the resultant alloy, U-6.0Nb, is ductile and can form fine wires that will be suitable for the present approach. The exact percentages of the alloying material are not critical and other elements may be included, such as, for example, titanium and aluminum. U-6.0Nb will be used in examples described herein, but it should be understood that one or more other uranium alloys can be used in the present approach.

Figure 15:
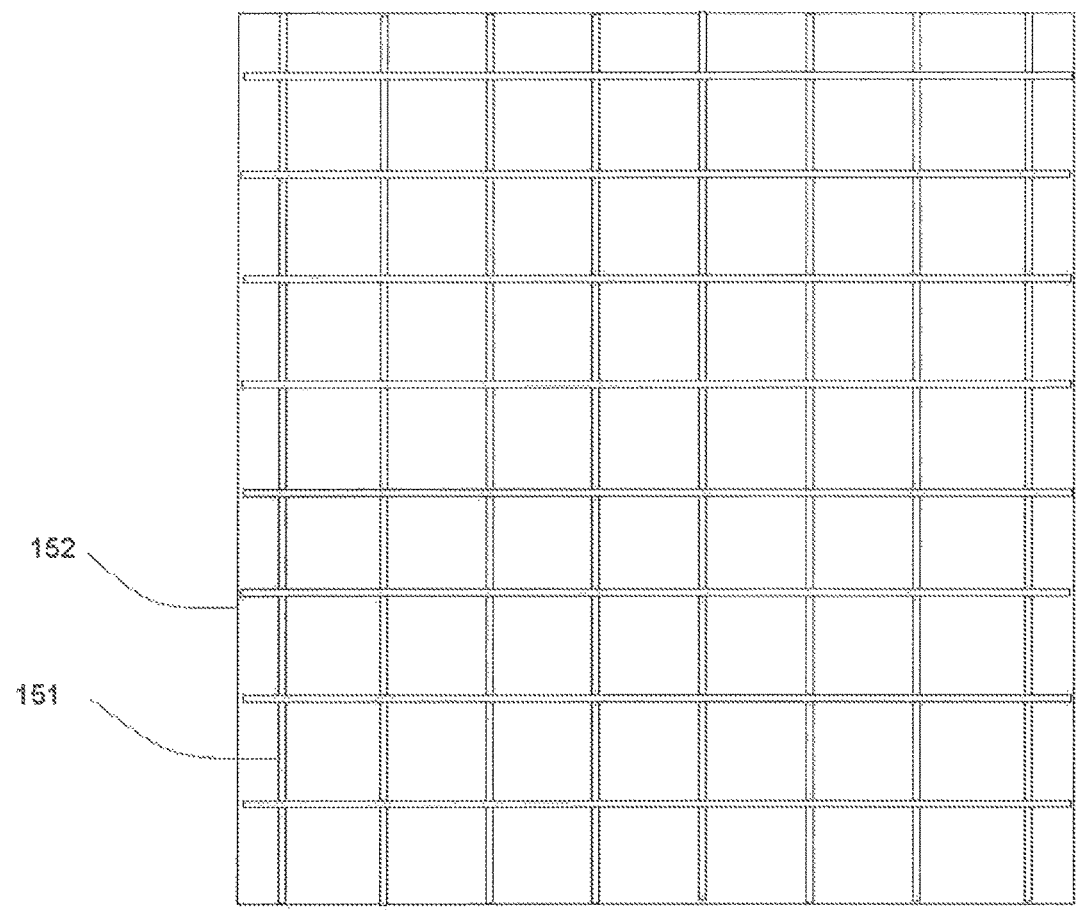
FIG. 15 illustrates a multi wire geometry for spreading the 238U.
Figure 16:
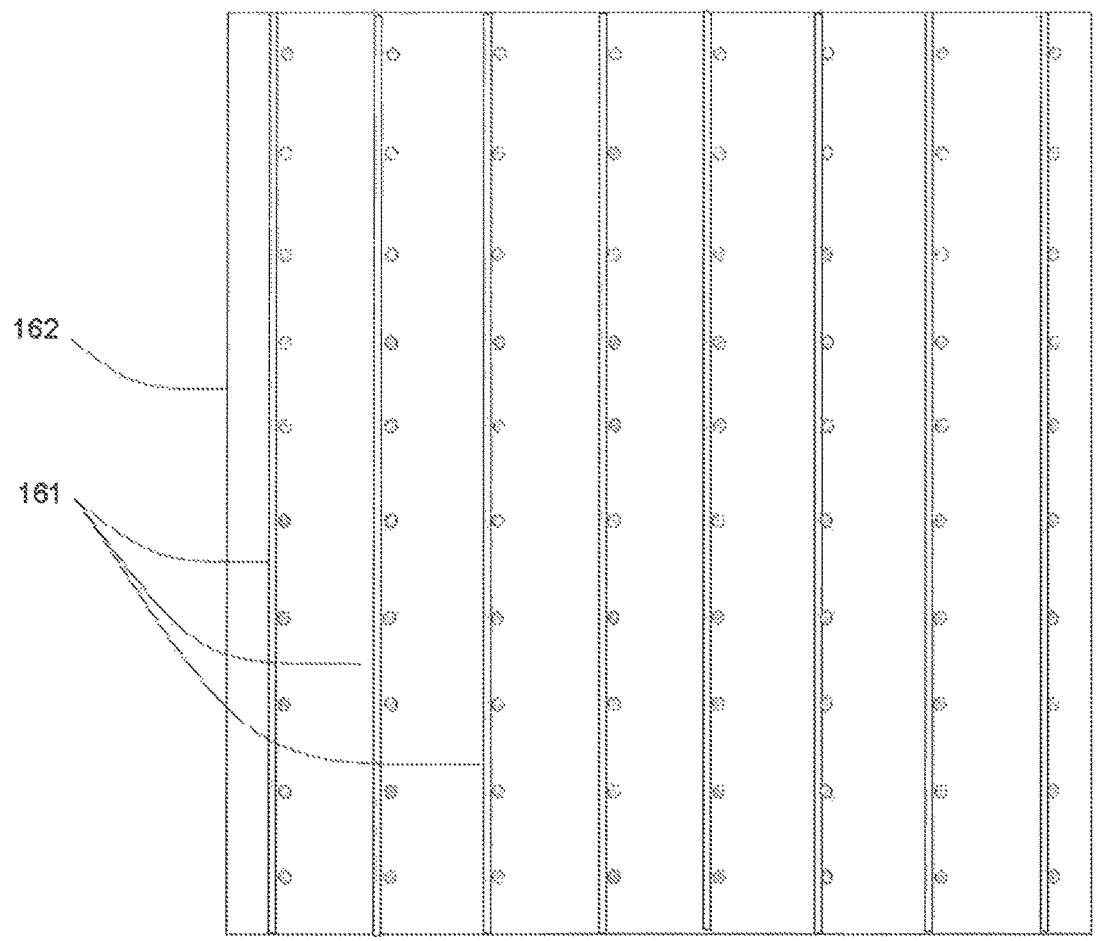
FIG. 16 illustrates a multi wire geometry for spreading the 238U.

An example embodiment of the U-6.0Nb wires in the form of a grid 151 is shown in FIG. 15 from a side view of the container 152. This embodiment represents a segment or layer of a neutron detector, where the neutrons could be coming from any direction. If 0.5 micron diameter metal wires 151 are used, spaced at 1.0 mm between wires, for example, then 1.0% of the cross-sectional area is covered by the wire layer. The wires are in a volume of scintillation or ionization materials in container 152. FIG. 16 shows, from a side view of the container 162, multiple layers 161 of the grid of wires of FIG. 15. The multiple layers of wire grids 161 within the volumes can be stacked with a layer-to-layer spacing of 1 mm, though the spacing may vary in other embodiments. It should be appreciated that the diameter and spacing configuration described in the embodiments are not limiting, as other configurations may be used without departing from the present approach. In this embodiment, the volume ratio of the scintillation or ionization material in the volume is over 99% of the volume such that most of the ionization can take place in the volume once the ions leave the wires.

Figure 17:
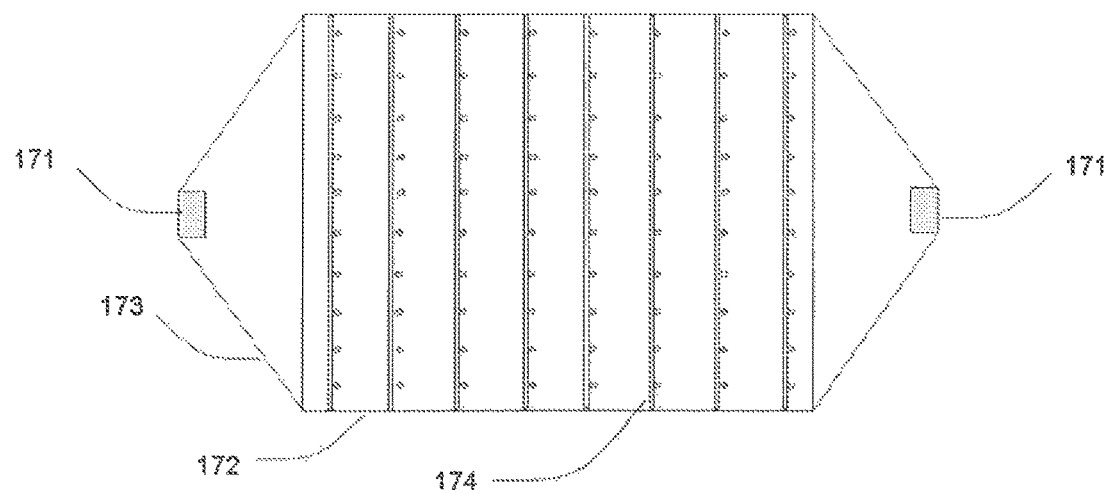
FIG. 17 illustrates photon detectors for detecting the light coming from the fast neutron induced fission decays in 238U.

FIG. 17 shows a side view of an embodiment in which the configuration shown in FIG. 16 is expanded to include photo detectors 171 to detect the ionization light coming from the fission ions 146 and 146 of FIG. 14 as they ionize scintillation gas in the container volume 172. The orientation of the container 172 and the associated light collectors 173 relative to the source can be in any direction as long as it is known. The photo detectors 171 can be, for example, silicon photo multipliers (SiPMs) or photo multiplier tubes (PMTs). As one of ordinary skill should appreciate, there is a broad range of optimizations that can be made of the diameters and spacings of the wires 174, the light collection geometries of the collectors 173 bringing the light to the photon detectors 171, and the overall number of layers of wires 174.

The choice of scintillation gas in the volume 172 will also affect the optimization. For example argon and xenon emit their scintillation at 125 nm and 175 nm respectively and require wavelength shifters to work with most SiPMs and PMTs. Nitrogen scintillates in the 300-400 nm region and P-10 (90% argon 10% CF4) emits in a region near 625 nm and do not require wavelength shifters. However, argon and xenon emit more photons. As one of ordinary skill should appreciate, there are a number of optimizations to consider for scintillation gas(es) and the choice may depend on the environment the specific detector is being designed for; for example if the environment has a very high gamma flux than xenon may not be preferred. The choice of scintillation gas may also be influenced by the dead time for the system as some scintillation gases emit light several times longer than others. Scintillation gases have dead times less than 1 microsecond. The rise times of the scintillation gases are less than 10 nanoseconds so as long as sufficiently fast SiPMs or PMTs and associated electronics are used, the fission events can be determined to this accuracy. The spatial resolution of the event is determined by the physical geometry of the detector element and can be as small of a few mm or as large as 10 s of cm.

Figure 18:
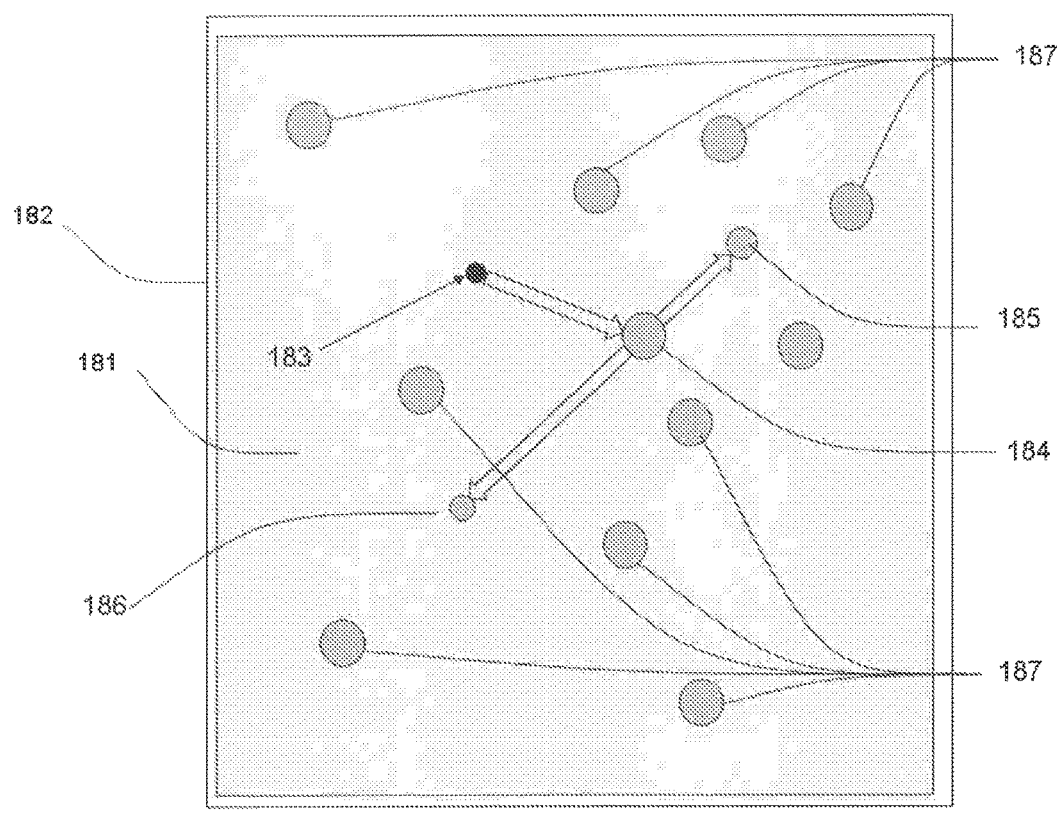
FIG. 18 illustrates enhanced 238U distribution by the inclusion of 11B BNNT Material as a scaffolding for dispersing 238U.

FIG. 18 shows a small piece of an embodiment in which the space or volume 181 between each of the wire grids, FIG. 15 151, FIG. 16 161 and FIG. 174, if filled with BNNT Material, aerogel, such as silica aerogel, or a combination of BNNT and aerogel. In this case the BNNT Material may comprise of 11B such that there is minimal sensitivity to thermal neutrons by having eliminated or minimizing the 10B. This embodiment combines the optimization of the combination of the 11B BNNT Material and the 238U wires and foils for enhancing the density of 238U. The 11B BNNT Material may serve as a scaffold for enhancing the amount of 238U present in the detector. The volume 181 of BNNT Material or aerogel contains individual 238U atoms 184 and 187, or clusters of 238U atoms embedded into the volume 181. These individual atoms 184 and 187 or clusters of atoms can be implanted into the layer 181 by, for example, ion beam implantation or through dispersion via a gas or liquid containing the 238U. The BNNT Material may be coated with a polymer or scintillation material that includes a dispersion of 238U. If a gas or liquid is selected to disperse the 238U into the BNNT Material and/or aerogel layer 181, the non-238U portion of gas or liquid must be capable of being evaporated while leaving the 238U atoms 184 and 187 in the BNNT Material and/or aerogel layer 181. Depending on the material, elevated temperatures may be used as BNNTs are stable to over 900 C. The final density of the 238U 184 and 187 can be raised until it interferes with the light reaching the photo detector, or the until the ionizing fission fragments 185 and 186 from the neutron 183 fissioning one of the 238U nuclei 184 encounter too much non ionizing material such as other 238U 187 as determined by the efficiency of collecting light at the photon detectors from the fission events. As one of ordinary skill should appreciate, a given detector will have an optimization of the amount of 238U in the wires and the amount of 238U in BNNT and/or aerogel layer 181 and the light collection efficiency of the arrangement as some of the light will be absorbed by the BNNT Material or aerogel with the embedded 238U 187.

Figure 19:
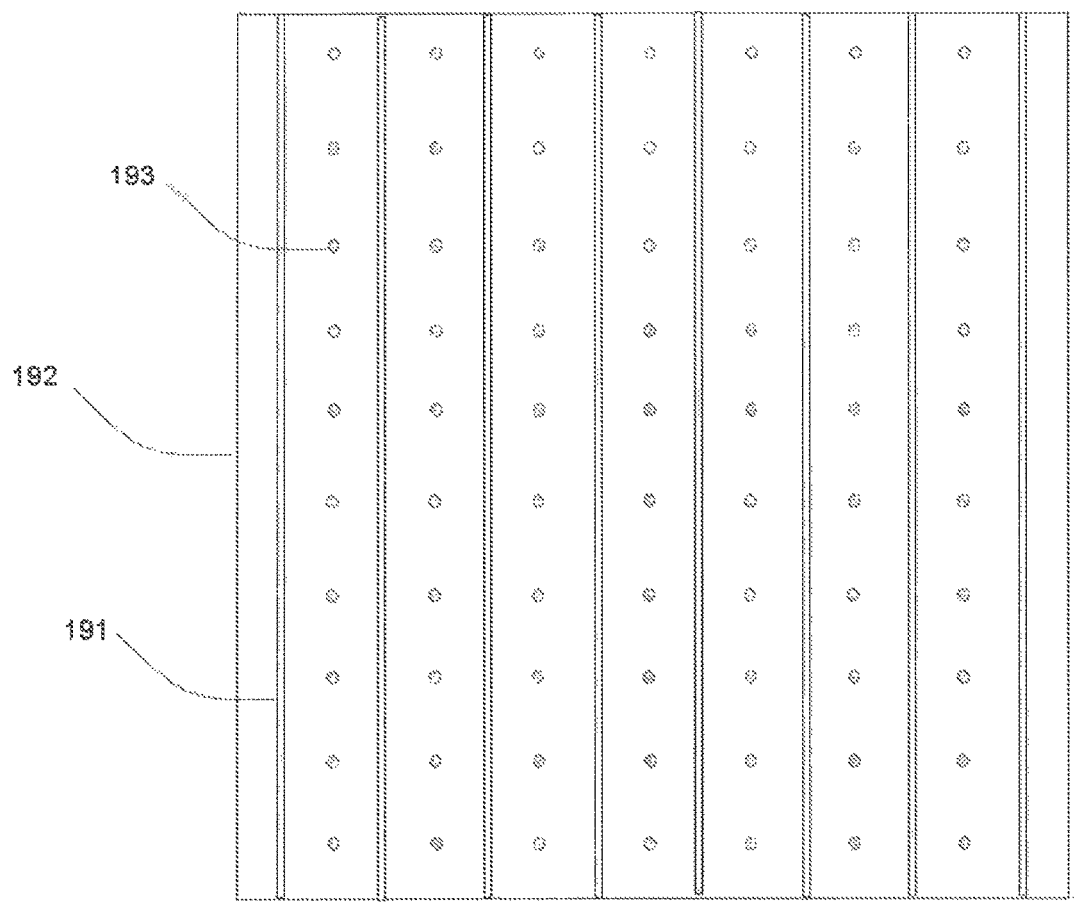
FIG. 19 illustrates a MWPC method of detecting the fission decays from fast neutrons absorbed on 238U.

FIG. 19 shows the side view of an embodiment in which 238U-6Nb alloy wire layers 191 and 193 are separated such that they can be electrically insulated from each other. The neutrons can come from any direction and if the neutron source direction and location are known then timing and spatial information becomes available. In this embodiment, the volume 192 is filled with a gas appropriate for a multi wire proportional counter (MWPC) system. In a cycle of three, every third plane, 191 and 192 is a ground plane, cathode plane, or anode plane. The orientation of the wires for a given plane does not matter as long as each adjacent plane is orthogonal or at sufficient angle to provide MWPC quality electric fields. A sufficiently high voltage is placed across the cathode and anode planes such that electrical signals are generated on the wires that can be detected by conventional MWPC readout systems. For some applications this embodiment may be preferred as MWPC can provide very accurate position resolution of the fission event on the size of the wire spacings or less. MWPCs can self-trigger and can have rise times and dead times on the order of a few 10s of nanoseconds. As one of ordinary skill in the art should appreciate, there is a broad range of parameters such as wire spacing, gas, and high voltage and readout system, for example, that can be adjusted to optimize a given detector for a given environment or application. As one of ordinary skill in proportional counters should appreciate, a wide range of ion pair detection technologies are available in addition to MWPCs, such as GEM and straw tube detectors.

Figure 20:
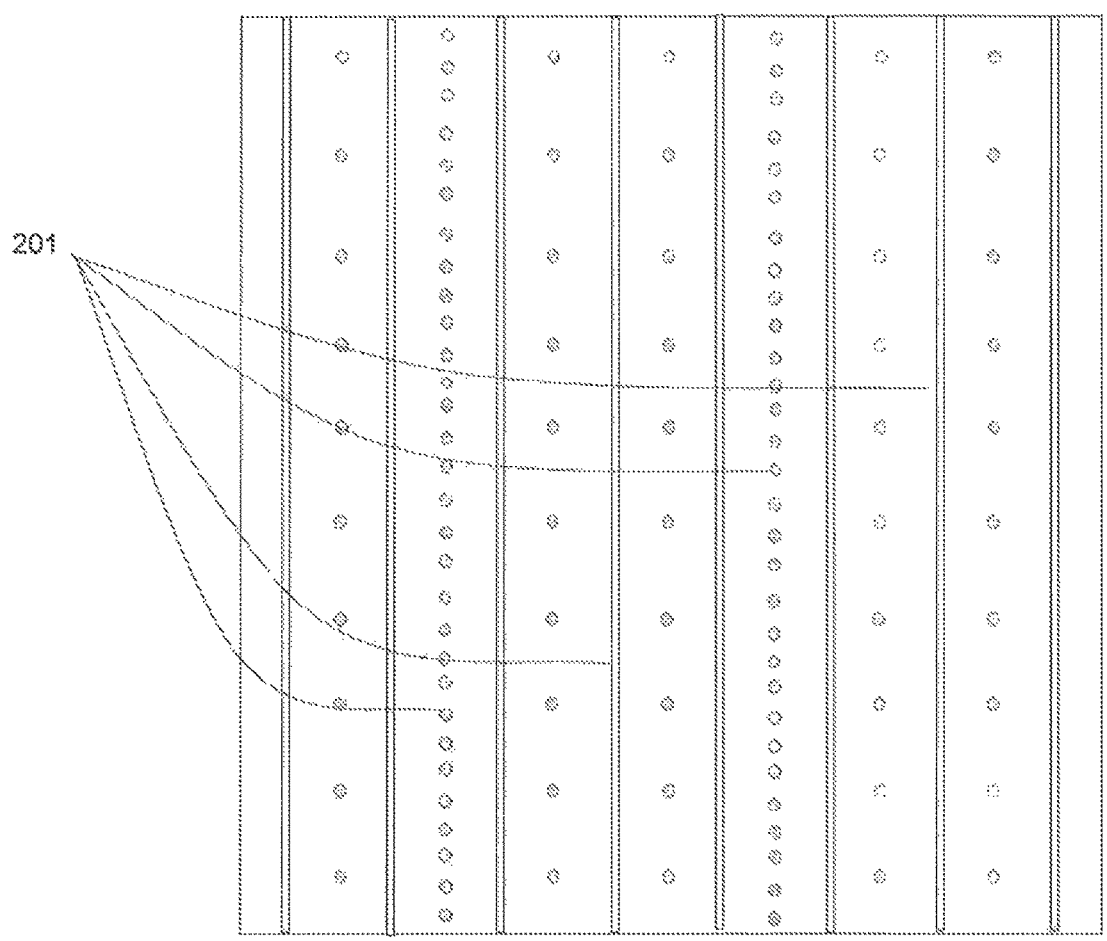
FIG. 20 illustrates a MWPC method of detecting the fission decays from fast neutrons absorbed on 238U.

For the MWPC counter embodiments, placing a BNNT and/or aerogel layer between the planes may interfere with the proportional counter process. However as shown in FIG. 20, the ground plane 201 can have smaller wire spacing while still getting the fission ions out of the ground plane. Alternatively a thin foil of 3-10 microns thick of the 238U-6Nb material can be used in place of the dense wires 201. If required for mechanical robustness, the wires and foil 201 can be made thicker. The result would be that only the outer few microns of the wires and foil would contribute fission event ions, however there can be an increase in the surface area of the wires 201 depending upon the final spacing.

The photo detector configurations described herein, including, for example, FIGS. 3-9 and 15-19, as well as the MWPC (GEM, straw tube, etc.) configurations, can be highly segmented by making the containers smaller and utilizing multiple containers to provide additional spatial resolution, background detection and coincidence capabilities. Further, multiple containers can be stacked or placed in close proximity so as to enhance the overall detector efficiency. Coincidences between the different segments can be used to determine that multiple neutrons came from a single fission event.

An example for 252Cf and 235U sources is that if a detector is to detect 0.1% of the fast neutrons coming from the source than 1.3 g/cm^2 of 238U is required. The total amount of 238U depends on the distance from the source. For example if the detector is at a distance of 10 cm 7 mol (1.7 kg) of 238U is required. If the radius of the detector is 20 cm than 4 times these amounts of 238U is required. These values of area density of 238U can be achieved by both the photo detector and MWPC options for reasonable thicknesses of detector. Average volume densities approaching 1 g/cc for 238U distributed in the detector volume can be achieved. The containers in some embodiments can exceed 90% active detector and only 10% container and internal electronics.

As one of ordinary skill with neutron sources should appreciate, a given detector can be tailored to be optimized for a given environment of fast neutrons, slower neutrons including thermal neutrons and background gammas. A diverse number of arrangements for wire sizes, wire spacings, ionization gases, proportional counter gases, ground planes, alloys of 238U and overall detector geometries is available. While the cross section of 238U is favorable for detecting fast neutrons preferentially over slow and thermal neutrons, the overall 238U cross section is still low from the perspective of overall detector efficiency. The way to increase the efficiency is to increase the amount of 238U that the fast neutrons encounter. The detector can simply made larger by the inclusion of more and more container elements. In addition, the density of 238U can be increased.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A boron nitride nanotube ("BNNT") based neutron detector comprising:
   a chamber;
   at least one photon detector positioned in the chamber;
   a BNNT material positioned in the chamber;
   and a scintillating material in the chamber;
   wherein the scintillating material is selected from the group consisting of a gas and a liquid; and
   wherein the at least one photon detector is positioned to detect at least a portion of photons emitted from ions traversing the scintillating material produced by neutron absorption in the chamber.

2. The neutron detector of claim 1, wherein the chamber further comprises at least one mirror surface positioned to reflect photons toward the at least one photon detector.

3. The neutron detector of claim 1, wherein the BNNT material is a BNNT aerogel.

4. The neutron detector of claim 1, wherein the BNNT material is formed from a boron feedstock having an enhanced fraction of 10B.

5. The neutron detector of claim 4, wherein the BNNT material includes an enhanced fraction of 10B.

6. The neutron detector of claim 1, wherein the scintillating material is dispersed in the BNNT material.

7. The neutron detector of claim 1, wherein the BNNT material comprises a scintillating material coating.

8. The neutron detector of claim 1, wherein the BNNT material is positioned in a scintillation gas.

9. The neutron detector of claim 1, wherein the scintillation gas comprises at least one of nitrogen, helium, neon, argon, krypton, and xenon.

10. The neutron detector of claim 1, wherein the BNNT material is suspended in a non-scintillating liquid within the chamber.

11. The neutron detector of claim 1, further comprising a scaffolding, wherein the BNNT material is stabilized within the chamber by the scaffolding.

12. The neutron detector of claim 1, wherein the BNNT material comprises a plurality of BNNT material wires.

13. The neutron detector of claim 12, wherein the plurality of BNNT material wires comprises a first plurality of generally parallel wires arranged in a first plane.

14. The neutron detector of claim 12, wherein the plurality of BNNT material wires further comprises a second plurality of generally parallel wires arranged in a second plane, the second plurality of generally parallel wires perpendicular to the first plurality of generally parallel wires.

15. The neutron detector of claim 12, wherein the plurality of BNNT material wires comprises a plurality of wire layers in the chamber.

16. The neutron detector of claim 1, wherein the BNNT material comprises at least one BNNT material sheet.

17. The neutron detector of claim 1, further comprising a 238U material, and wherein the BNNT material provides a scaffolding for the 238U material.

18. The neutron detector of claim 17, further comprising a scintillating gas in the chamber.

19. The neutron detector of claim 17, wherein the BNNT material includes a scintillating material coating.

20. The neutron detector of claim 17, wherein the BNNT material is formed from a boron feedstock having an enhanced fraction of 11B.

21. A method of detecting neutrons comprising:
    detecting at least a portion of photons emitted from ions traversing a scintillating material produced by neutron absorption in a chamber having BNNT material, wherein the scintillating material is selected from the group consisting of a gas and a liquid.

22. The method of claim 21, wherein the BNNT material comprises a BNNT aerogel.

23. The method of claim 21, wherein the BNNT material includes a scintillating material coating.

24. The method of claim 21, wherein the BNNT material is positioned in a scintillating material.

25. The method of claim 21, wherein the 238U is in an alloy.

26. A BNNT based neutron detection system comprising a plurality of neutron detectors, each neutron detector comprising:
    a chamber;
    at least one photon detector positioned in the chamber;
    a BNNT material positioned in the chamber;
    a scintillating material in the chamber;
    wherein the scintillating material is selected from the group consisting of a gas and a liquid;
    wherein the at least one photon detector is positioned to detect at least a portion of photons emitted from the ions traversing the scintillating material produced by neutron absorption in the chamber.

* * * * *